United States Patent [19]

Toniolo

[11] 4,431,359

[45] Feb. 14, 1984

[54] ELEVATOR FOR THE HANDLING OF CONTAINERS, PARTICULARLY IN HARBORS

[76] Inventor: Alberto Toniolo, Venezio San Polo, 2466, Italy

[21] Appl. No.: 172,648

[22] Filed: Jul. 28, 1980

[30] Foreign Application Priority Data

Aug. 2, 1979 [IT] Italy .............................. 40093 A/79

Jul. 11, 1980 [IT] Italy .............................. 40057 A/80

[51] Int. Cl.[3] .............................................. B65G 63/00

[52] U.S. Cl. ..................................... 414/139; 414/459

[58] Field of Search ...................... 414/139, 92, 95, 96, 414/137, 458, 459

[56] References Cited

U.S. PATENT DOCUMENTS 3,812,987 5/1974 Watatani ......................... 414/139 X 4,106,639 8/1978 Montgomery et al. ............. 414/139

4,293,077 10/1981 Makino ........................... 414/139 X

FOREIGN PATENT DOCUMENTS 1556636 10/1970 Fed. Rep. of Germany ...... 414/139

*Primary Examiner*—Leslie J. Paperner

*Attorney, Agent, or Firm*—Lowe, King, Price & Becker

[57] ABSTRACT

An elevator for the handling of containers, particularly in harbors, comprises a self-propelled or fixed framework (1), which may also be completely or in part incorporated with the structure of the quay crane, suitable for the receipt of trailers or railway wagons in its lower part.

At the inside of the framework (1) there is defined an empty space with a vertical axis, open at the top and at the bottom, for the vertical transfer—in either vertical direction—of containers (3, 76) between two end positions: the upper one to receive from or to deliver to a grabbing element of the quay crane the containers (3, 76) and the lower one to deliver the containers to, or to withdraw them from, a trailer or a railway wagon situated in a gallery equipped and comprised between the body sides of the framework (1) at the base of said empty space.

Between the end positions of the elevator at least one intermediate position is provided in order to form a storage unit for containers (3, 76).

The elevator is equipped with its own devices for the co-ordinated transfer by sections of the containers (3, 76) from one position to the following one in both directions.

18 Claims, 82 Drawing Figures

FIG. 8
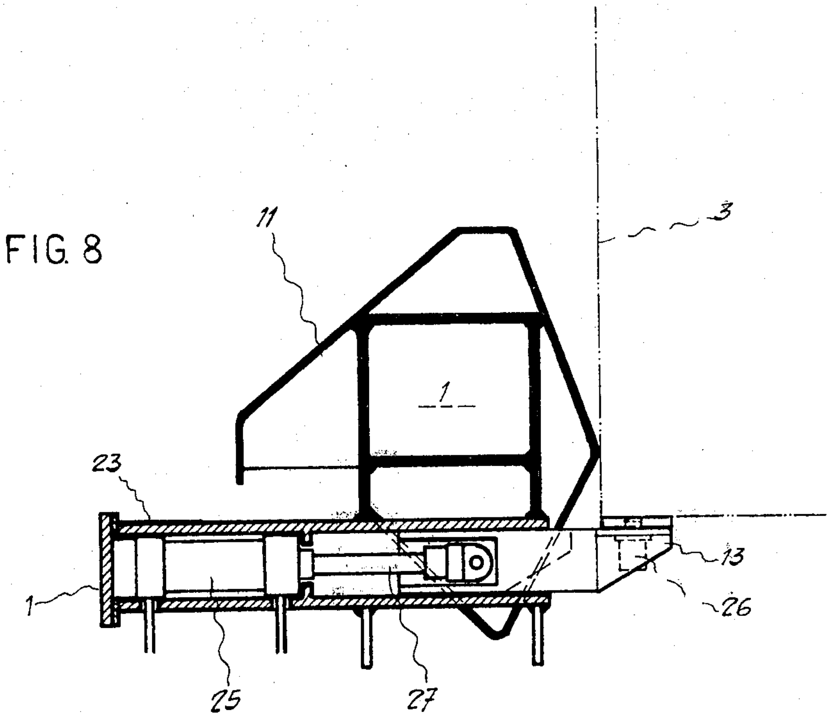
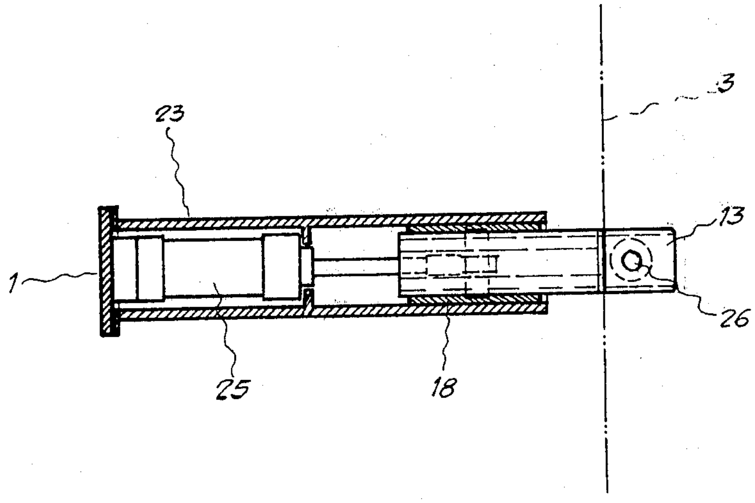
FIG. 9

FIG.12
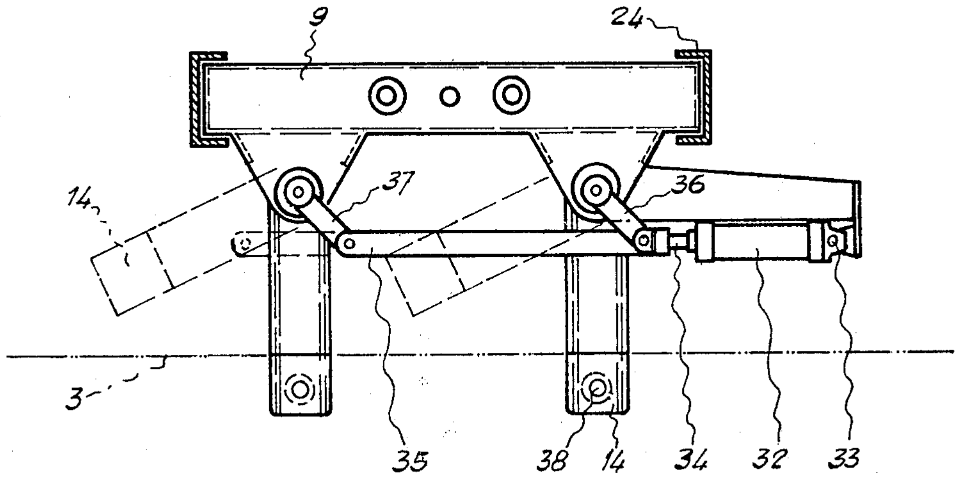
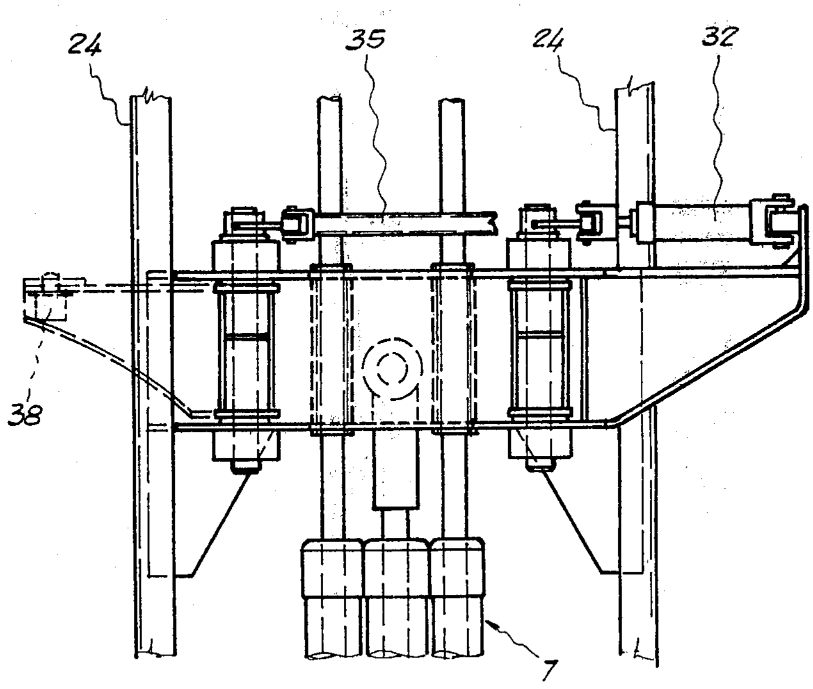
FIG.13

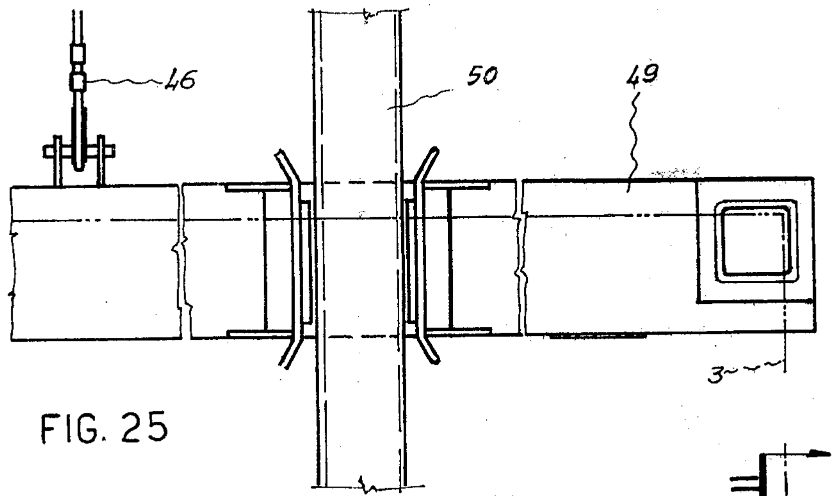
FIG. 25
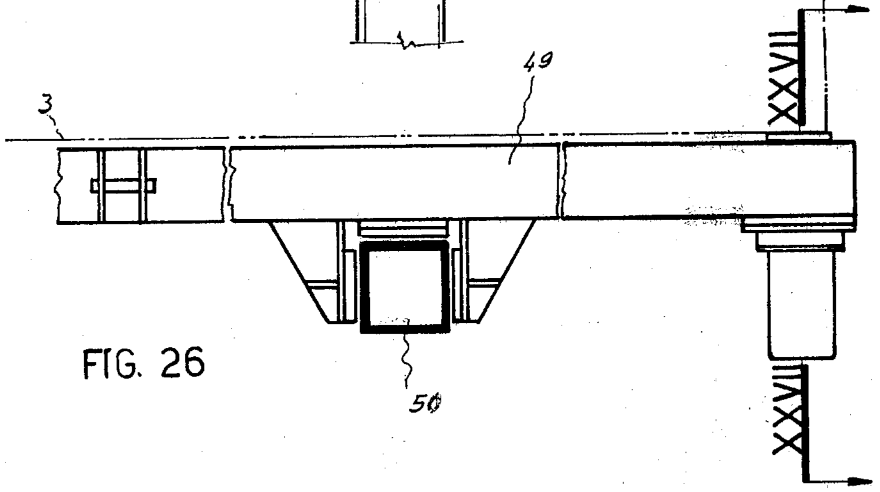
FIG. 26
FIG. 27
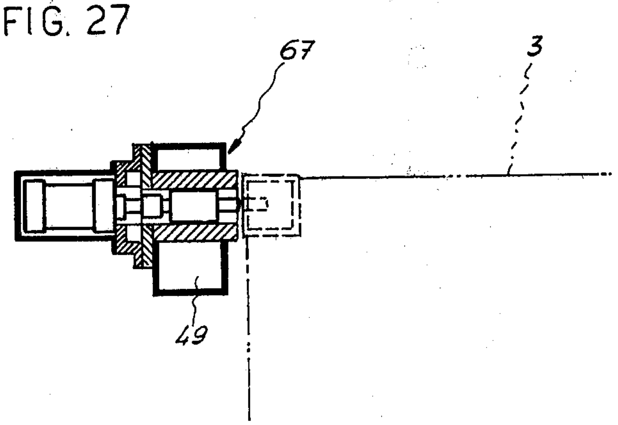

FIG. 30
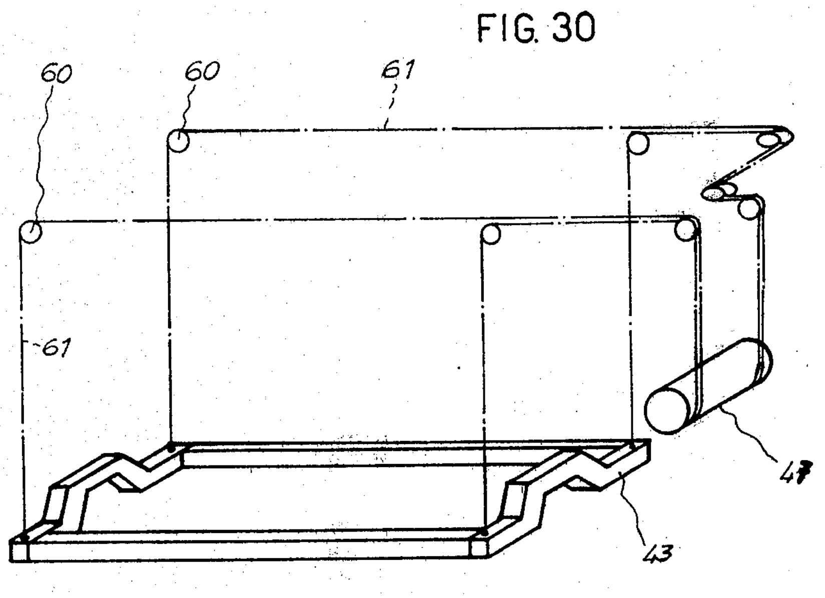
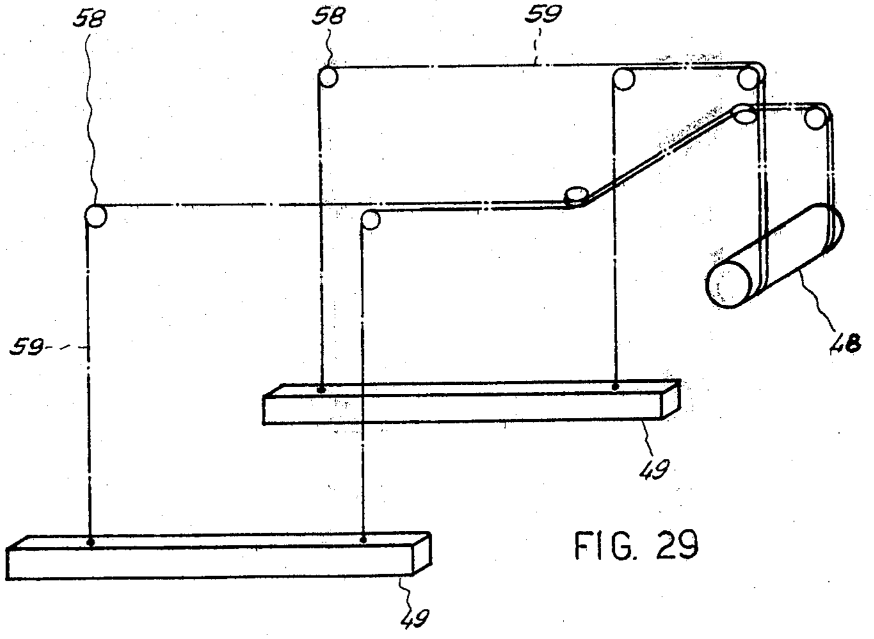
FIG. 29

ELEVATOR FOR THE HANDLING OF CONTAINERS, PARTICULARLY IN HARBORS

The invention concerns an elevator for the handling of containers, particularly in harbours, that is to say a machine suitable for the transfer of containers destined for marine, lake or river transport of goods from the quay crane to the lorries and vice versa; such containers having generally the following sizes: length between approximately 3 m and 12.5 m, width approximately 2.5 m and height approximately between 1 m and 3 m.

The prior state of art comprises self-propelled hoists of the types having forks grabbing from the bottom and from the top and of the types with gantry and rider, which simply lift one container at a time and transfer the container to another position in order to deposit it thereat. Such transfers are made, for example, between various positions in the quay yard. Moreover, there are elevators, which lift the container and load it on a trailer, which in turn makes the transfer from the yard to the quay and vice versa; sometimes the trailer also serves as a deposit, or temporary storage.

In this manner the transfer cycle from the ship to the deposit consists of separate sections, having different lengths and difficulties, leading to great unbalances of the relative periods of time, in which the distances are covered, thus preventing effective co-ordination and continuity among the different sections of the cycle. For example, at the transfer points of the container from one section of the cycle to the other the container, the trailer and the grabbing element of the crane must all be present simultaneously in order to avoid losses of time. However, such a contemporaneity in practice occurs only after a considerable time waiting of either the grabbing element or the trailer, depending on the different distances covered, the different modalities and the different difficulties encountered by both means.

Since the grabbing element of the crane covers nonproductive vertical distances above the quay and, moreover, the operator seated in the crane cabin has to work at a considerable distance from the trailer level, the maneuver of centering the container on the trailer and of withdrawing it is made long and complicated. Additionally, there are further phase displacements and time losses during the cycle, as the crane and the trailer sometimes have to carry out subsidiary operations. Finally, if a ship is to be unloaded or loaded having two cranes, serving two different holds with a substantially different number of containers therein, the crane for the transfer from the hold with the larger load needs more time than the other.

From the aforesaid there is seen a need for solving the technical problem of finding an elevator, which allows elimination of the down time of waiting for the coupling of the grabbing element of the crane with the container as well as reduction of the vertical distance covered by the grabbing element of the crane, which eases the maneuvers of the crane operator and eliminates or reduces the losses of time owing to phase displacements, and which speeds up the operations of cranes in general, especially of those which must carry out swifter work. Thus, continuity and swiftness of the transfer cycle is required to be obtained, with independence of one section of the operating cycle from the other and therefore with a higher productivity of harbour transfer operations.

The present invention solves the above-said technical problem by adopting an elevator which may be self-propelled, or of the fixed type or even completely or in part incorporated with the quay crane, which vertically transfers the containers in one direction or the other inside an empty space with vertical axis, the elevator space being open at the top and at the bottom thereof. The transfers are made between two end positions: the upper one in order to receive the containers from or to deliver them to the quay crane, and the lower one in order to deliver the container by means of the elevator equipment to, or to withdraw them from, the trailer of a truck centered in an equipped tunnel comprised between the body sides of the elevator at the base of said empty space. Between one and the other end positions at least one intermediate position may be distributed, forming storage units for containers, served by the equipment of the elevator for the transfer of the containers towards the top or the bottom, the equipment of the elevator being co-ordinated in order to obtain the continuity of the flow of containers in the empty space in both directions.

The advantages obtained by this invention are: elimination or decrease of the transfer down times; reduction of the nonproductive vertical distance covered by the grabbing element of the crane to the advantage of the productive run; abbreviation of the maneuvering time of the crane operator and decrease of the centering problems; decrease of the container transfer costs; a possibility of having a self-propelled elevator or one incorporated completely or in part with the crane; a possibility of carrying out the double cycle of alternating unloading and loading very advantageously, that is of one container going and the other returning, which until the present has been the subject of inconvenient attempts, by means of two elevators side by side on the quay under the same crane; continuity of the cycle; a possibility of loading and unloading containers of different lengths; possibility of loading and unloading containers directly on respectively from lorry trailers or railway wagons.

BRIEF DESCRIPTION OF THE DRAWINGS

The forty enclosed sheets of drawing describe-just for example-two ways of realization of an elevator according to this invention.

The drawing sheets 1 to 18 describe an elevator subject of the Italian patent application no. 40093 A/79, priority of which is claimed, suitable to transfer single containers of established length or two or more aligned containers of submultiple length of the established one.

Figure 1:
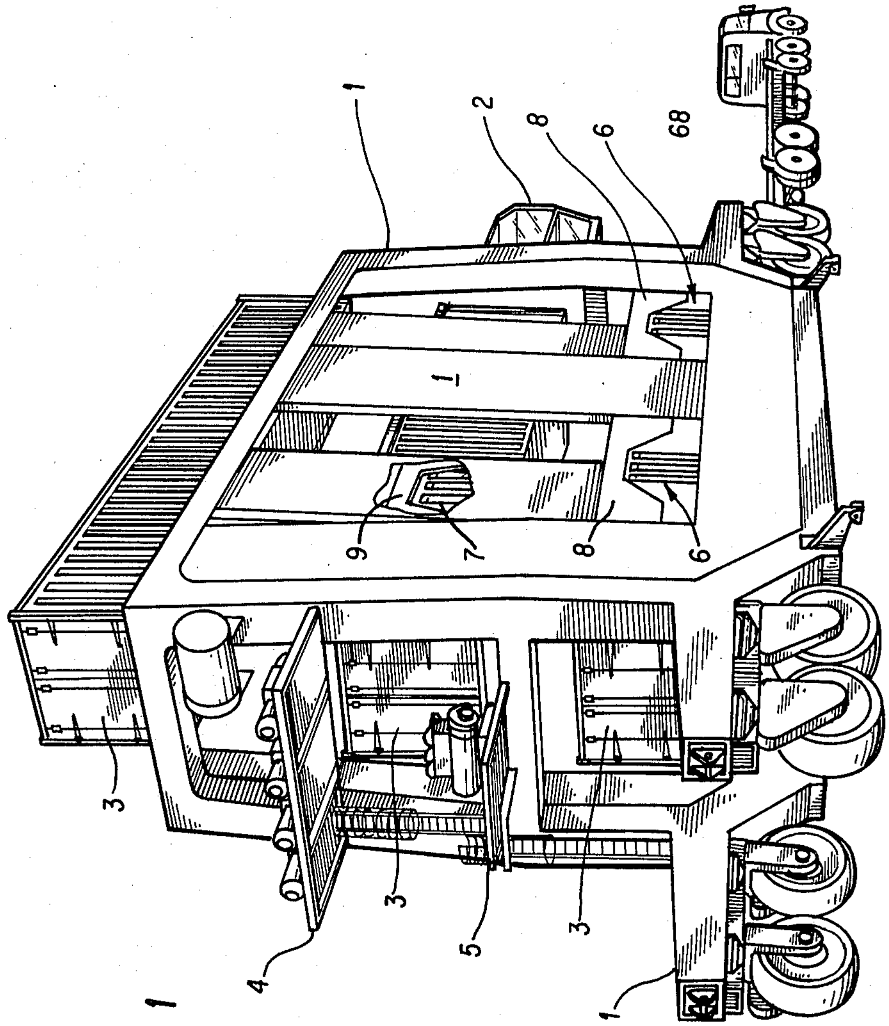

The drawing sheets 19 to 40 describe a second type of elevator subject of the Italian patent application no. 40057 A/80 of the same inventor, priority of which is claimed as well, suitable to transfer containers of any length and also to be used for the loading and unloading of railway wagons and truck trailers.

Figure 2:
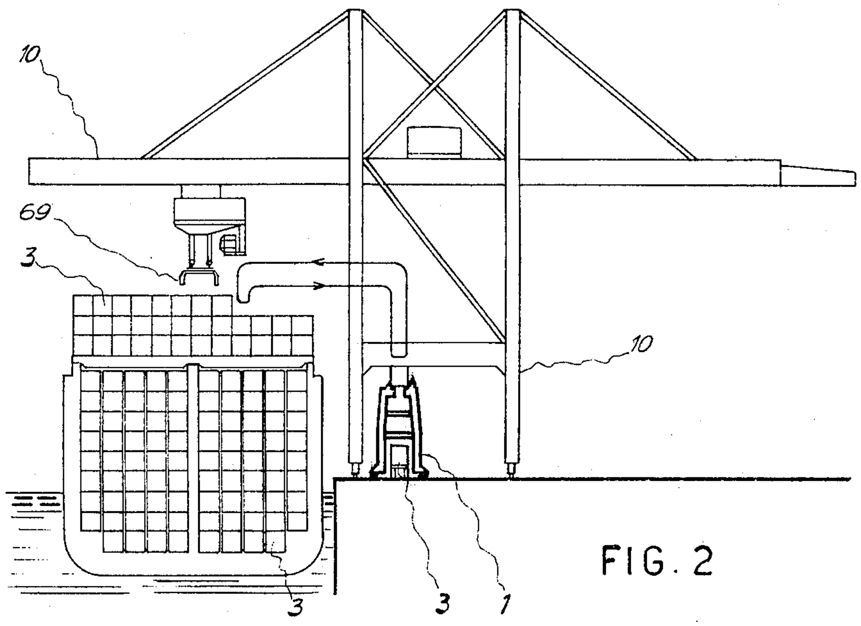

FIG. 1 is a perspective view of an elevator suitable for the transfer of one or more than one container of established length with three containers accommodated at the top, showing a transport truck which has left the elevator after having been unloaded: the elevator being of a self-propelled type with retractable support feet;

FIG. 2 is a schematic view in elevation of the loading and unloading cycle carried out separately between a ship and the elevator by means of a bridge crane.

Figure 3:
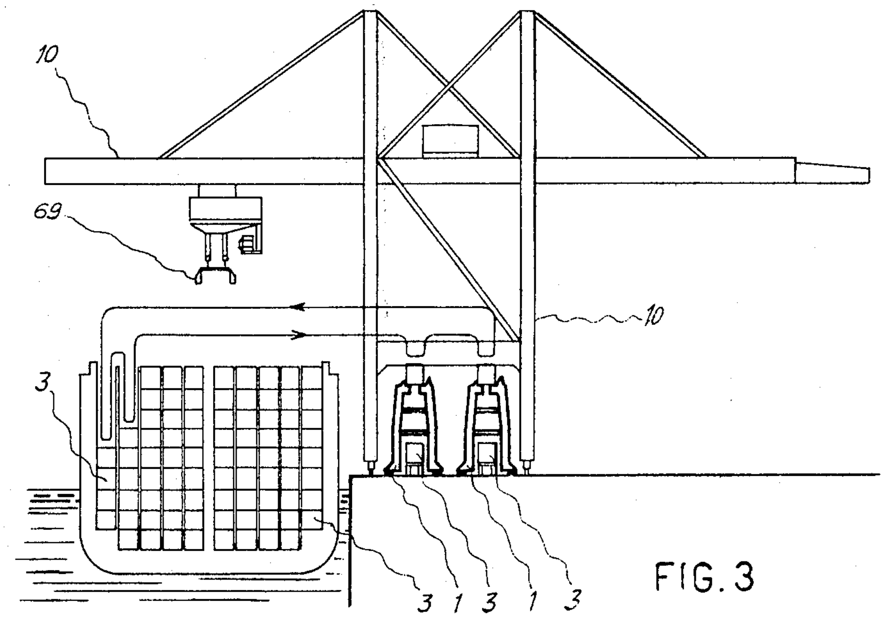

FIG. 3 is a view like that of FIG. 2, but for the case of alternated loading and unloading in the same cycle made possible by the presence of one elevator for the unloading and one for the loading.

Figure 4:
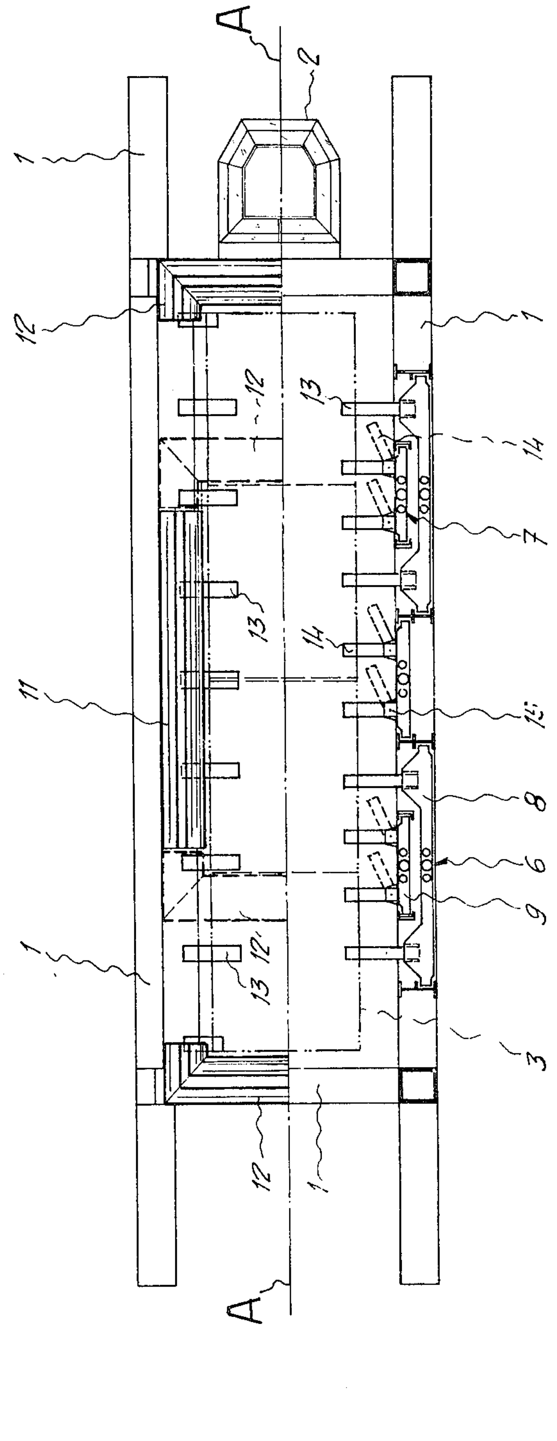

FIG. 4 is the plan projection of a elevator of the type as in a top FIG. 1, represented one half in view (summit tafferel) and one half in a horizontal section immediately below the tafferel in order to show the summit support level: the longitudinal line A—A separating the section from the view.

Figure 5:
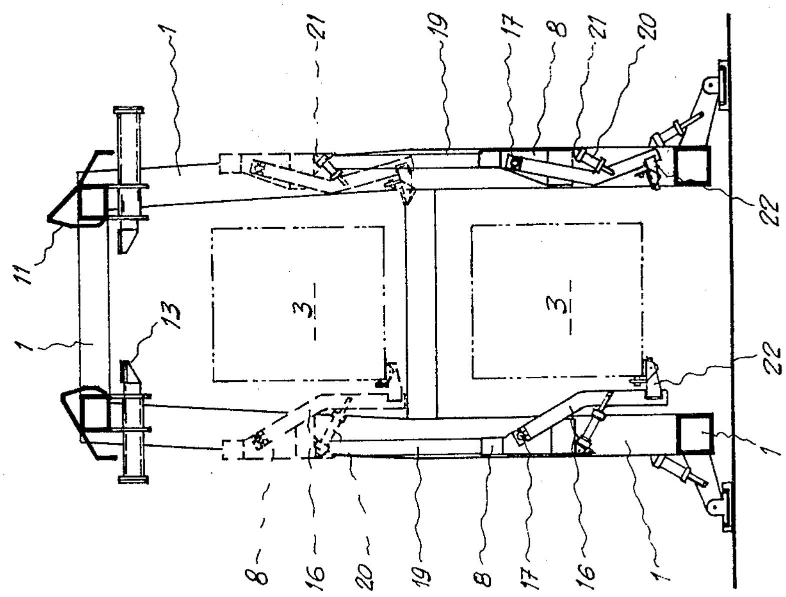

FIG. 5 is a schematic vertical cross section of FIG. 4 in order to show: on one side (left) with full lines the container grabbing arms extended and engaged in the lowest position and with dashed lines in the intermediate position at the end of the "low path", and on the other side (right) the same arms in the corresponding positions, but in a rectracted, and is engaged, position.

Figure 6:
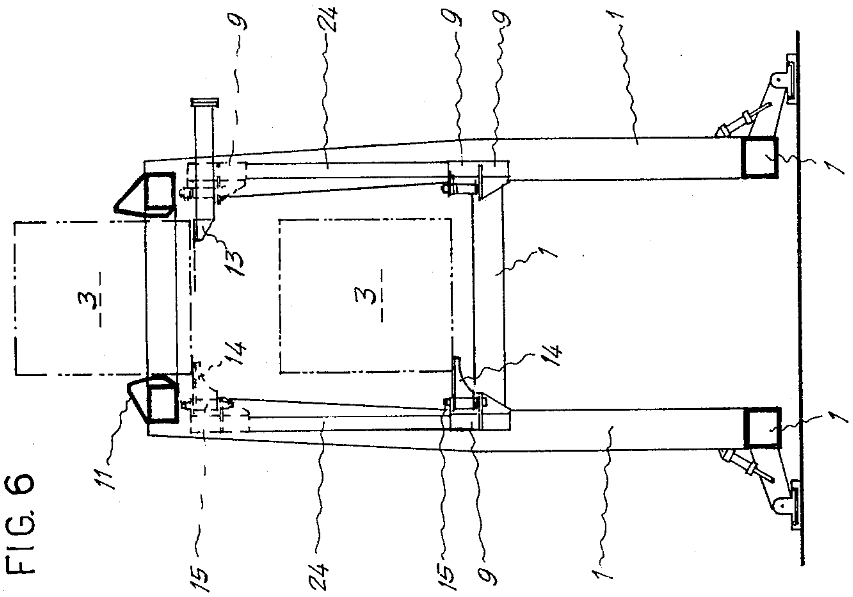

FIG. 6 is a schematic vertical section like that of FIG. 5, however relative to the grabbing brackets of the container on its "high path", that is from the intermediate position to the top.

Figure 7:
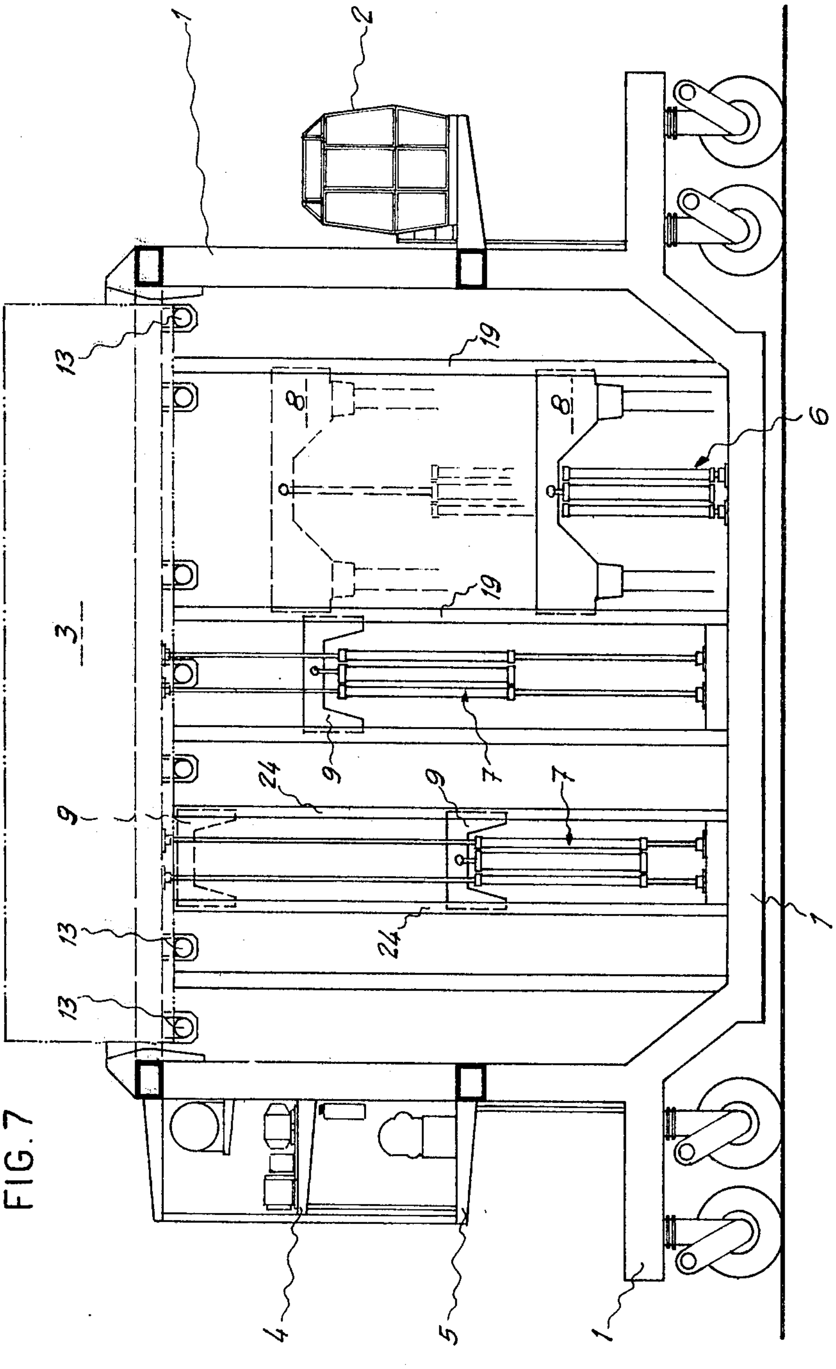

FIG. 7 is a schematic longitudinal section of the elevator to show the hydraulic operation cylinders for the vertical movement of the arms and the grabbing brackets.

FIG. 8 is a vertical cross section made corresponding to the top in order to show the detail of the retractable support of the container in the top position.

FIG. 9 is the plan view of FIG. 8.

Figure 10:
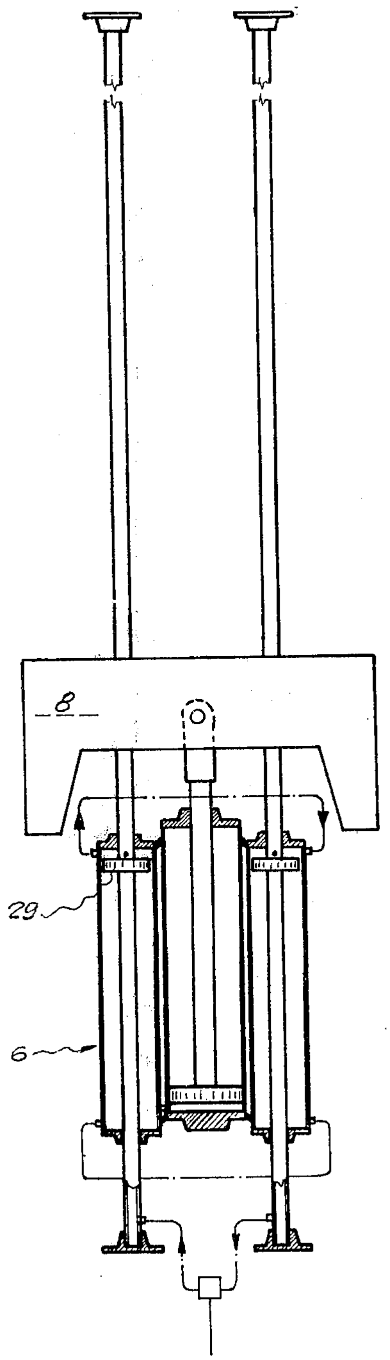
Figure 11:
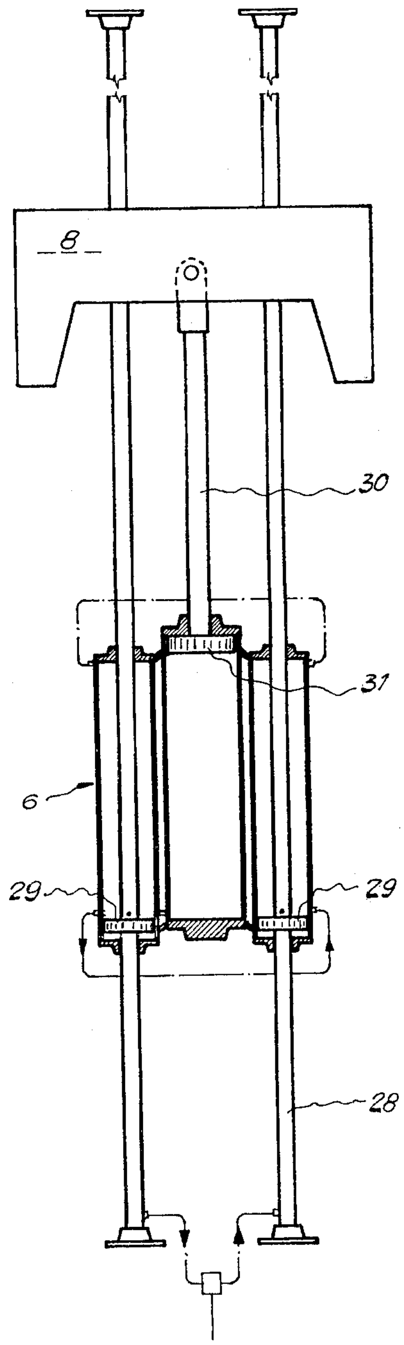

FIGS. 10 and 11 are schematic view in elevation partially in section referred to FIG. 7 in order to show the positions of the operation cylinder pistons at the beginning and at the end of the "low path".

FIG. 12 is the plan view of the detail of a pair of container support brackets like those of FIG. 6 in the working position (full lines) and in the retracted position (dashed lines).

FIG. 13 is the view in elevation of the detail of FIG. 12.

Figure 14:
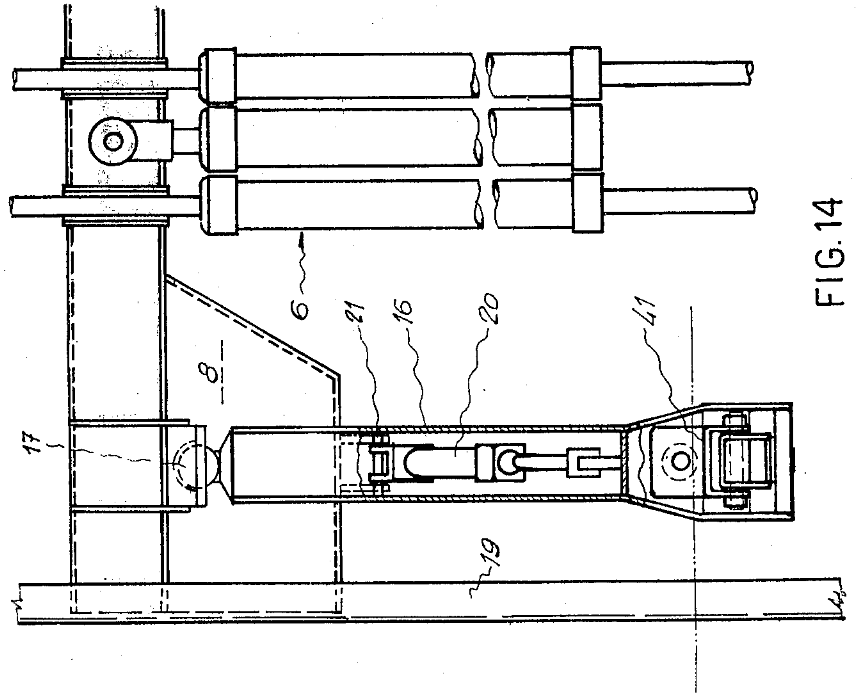

FIG. 14 is a schematic vertical longitudinal section relative to a grabbing arm of the "low path" according to FIG. 5.

Figure 15:
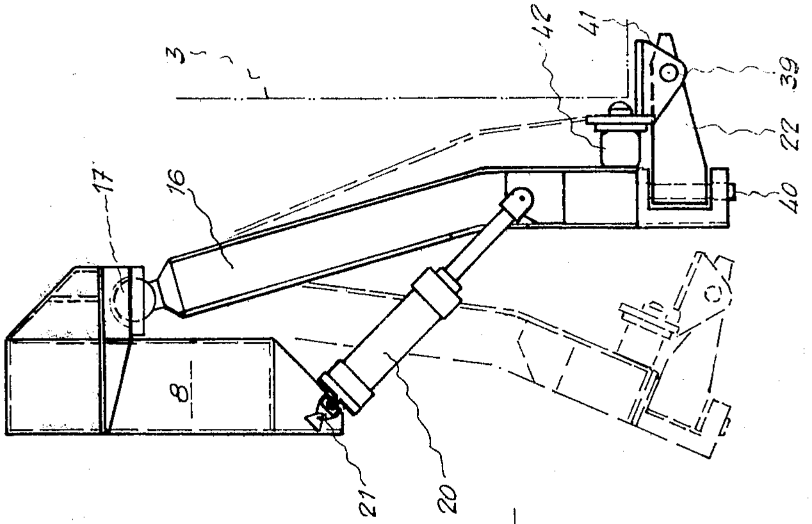

FIG. 15 is a left hand view of FIG. 14.

Figure 16:
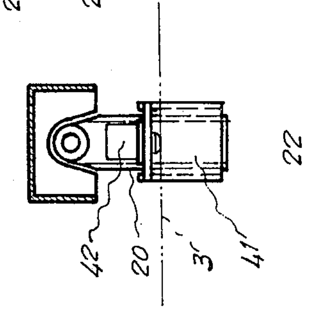

FIG. 16 is a plan view of the articulated container support square at the arm of FIGS. 14 and 15.

It is to be observed that all figures from 1 to 16 refer to an elevator version of universal type as to the possibility of inserting thereon containers of different established lengths, also when aligned; such a version, which for the sake of brevity is called a bottom grabbing type, is self-propelled (but it might also be towed or fixed to the bridge crane) and operated hydraulically, for example. Another version of the elevator, which we shall denote as grabbing at the corner blocks, suitable-but not in a limiting way—for the handling of containers of one length only, may be self-propelled as well (but also may be towed by the bridge crane or incorporated with it) is mechanically operated, and is described in figures from 17 to 27.

Figure 17:
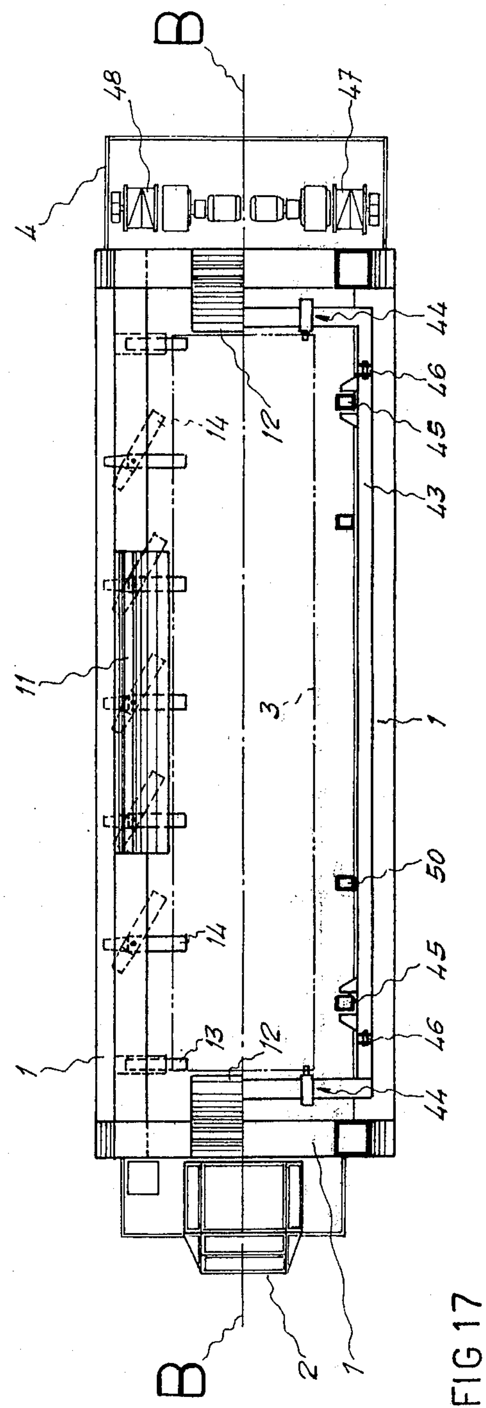

FIG. 17 is the plan projection of an elevator of the type grabbing at the corner blocks, represented for one half in view on the tafferel (upper part) and for the other half in horizontal section immediately below the tafferel in order to show the frame for the "high path" with the corresponding guides: the longitudinal line B—B separating the view from the section.

Figure 18:
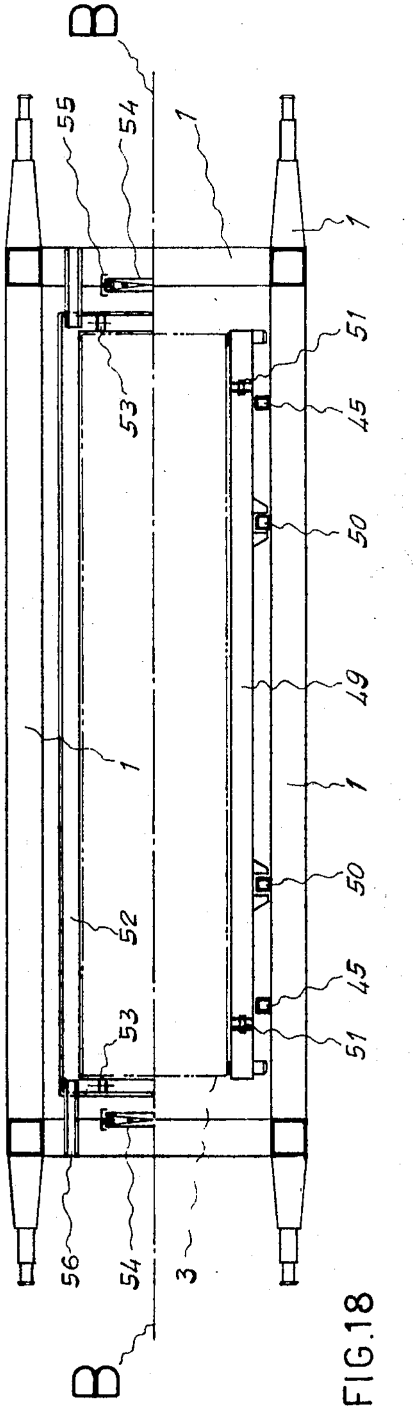

FIG. 18 is a plan projection of the same type as that of FIG. 17, however in horizontal section concerning the longitudinal container support beam during its "low path" beneath the line B—B and above that line the hanging container grabbing frame placed on the truck.

Figure 19:
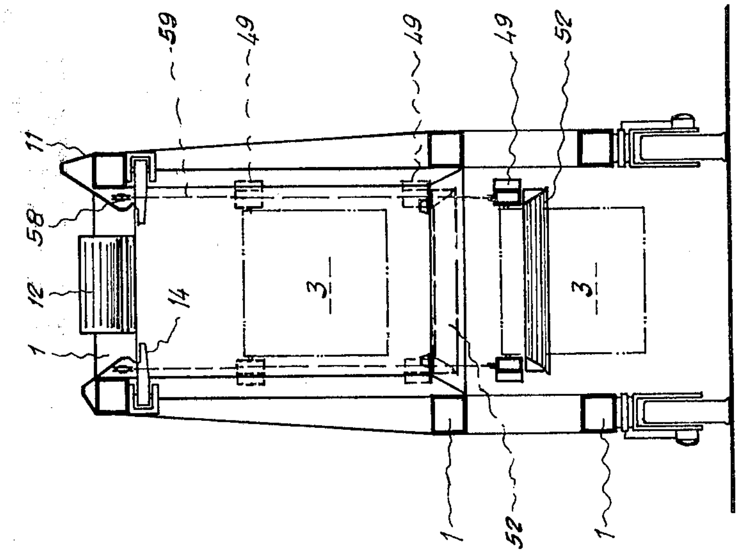

FIG. 19 is a schematic vertical cross section of FIGS. 17 and 18 in order to show the "low path" device with the corresponding grabbing frame for the transfer of the container from the truck to the intermediate position and vice versa.

Figure 20:
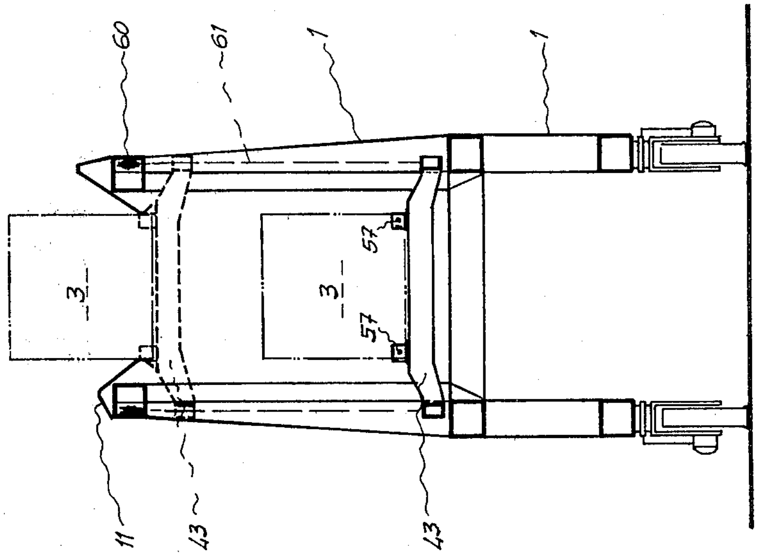

FIG. 20 is a section like that of FIG. 19, however concerning the "high path".

Figure 21:
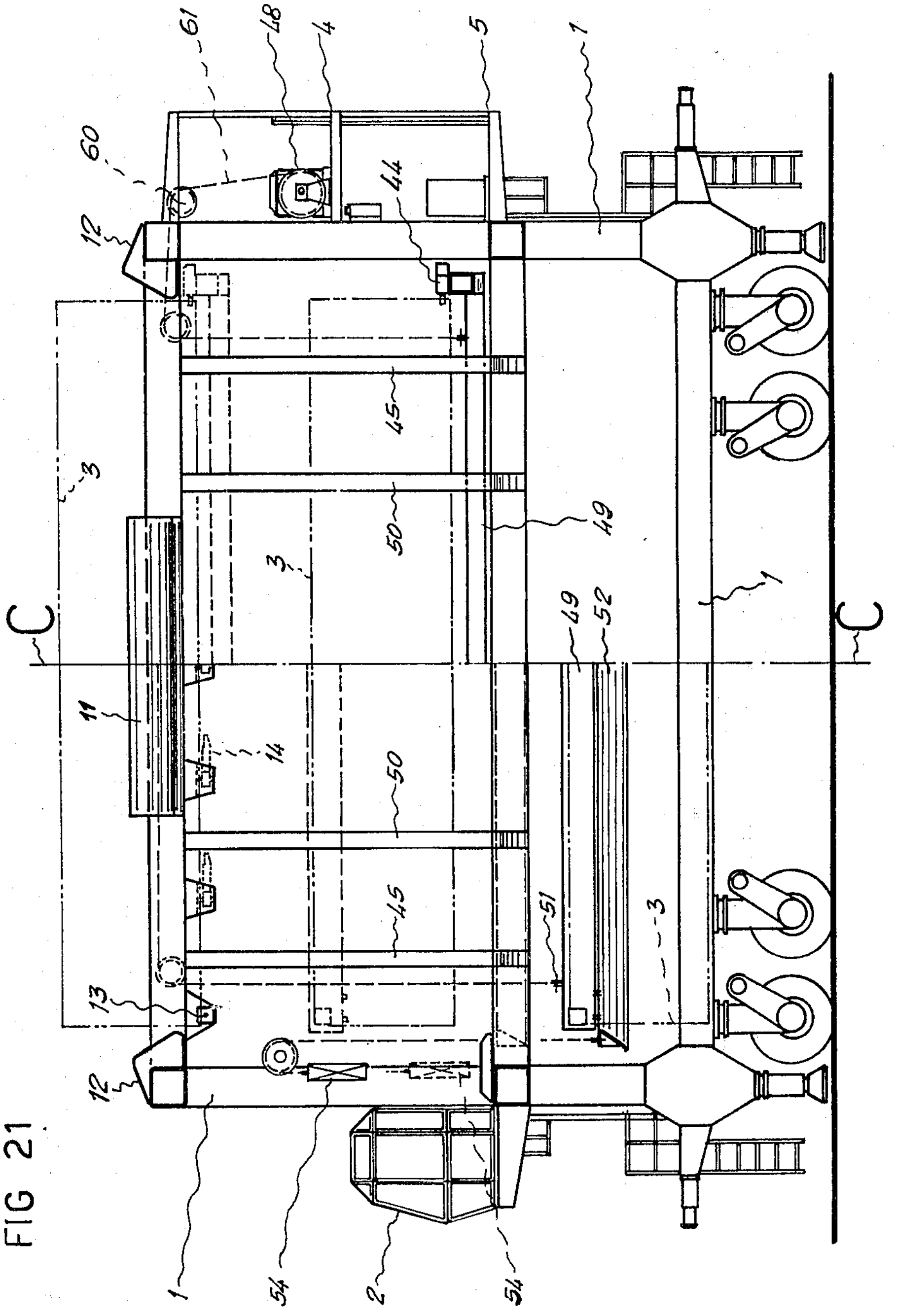

The part left of the line C—C of FIG. 21 is a vertical longitudinal section of the elevator of FIGS. 17 and 18 in order to show the longitudinal container support beam relative to FIG. 19 as well as the hanging grabbing frame with its counterweight; the part to the right of line C—C shows instead the frame with head cross beam relative to the "high path" of FIG. 20.

Figure 22:
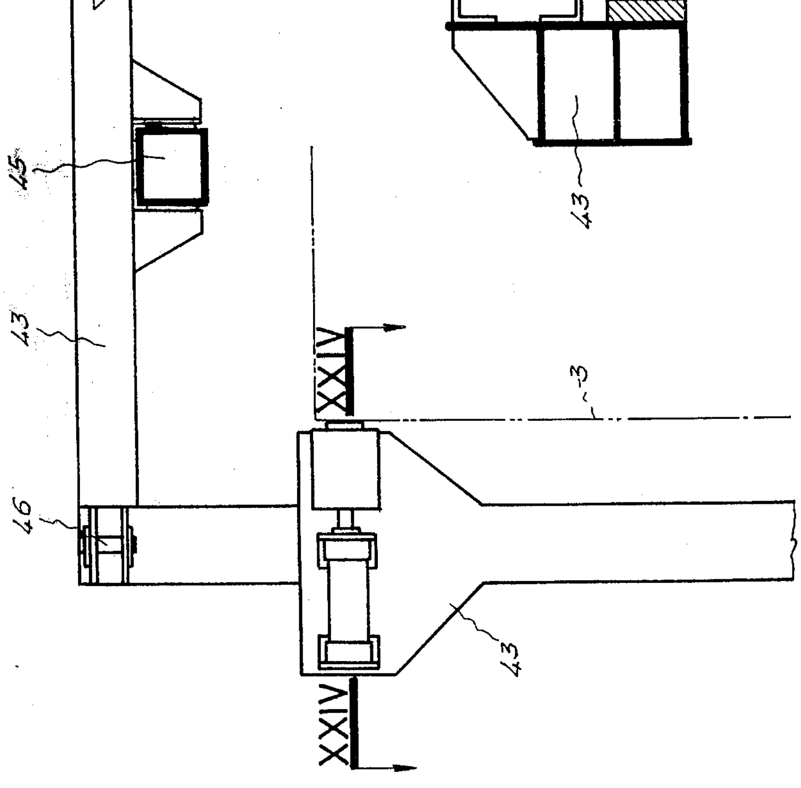

FIG. 22 is the plan view of the detail of the head cross beam with the corresponding frame according to FIGS. 20 and 21.

Figure 23:
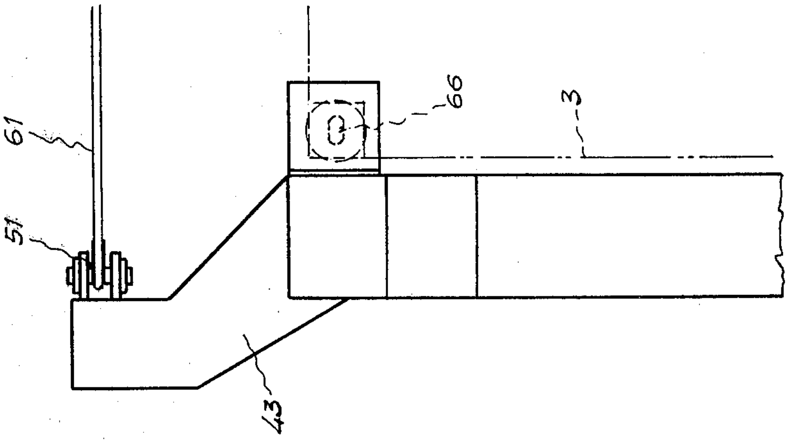

FIG. 23 is a left hand view of FIG. 22.

Figure 24:
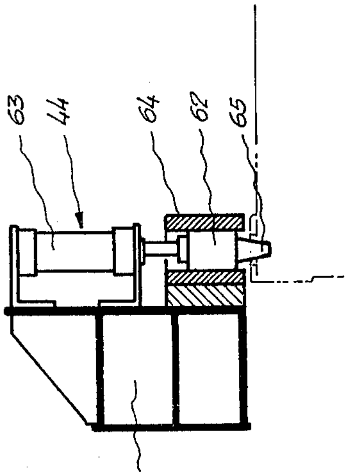

FIG. 24 is the section XXIV—XXIV of FIG. 22 in order to show the grabbing at the corner block.

FIG. 25 is a view in elevation of a section of the longitudinal container support beam near its end in order to show the guided vertical gliding.

FIG. 26 is the plan view of FIG. 25.

FIG. 27 is the section XXVII—XXVII of the right hand part of FIG. 26 in order to show the grabbing of the frame on the container.

Figure 28:
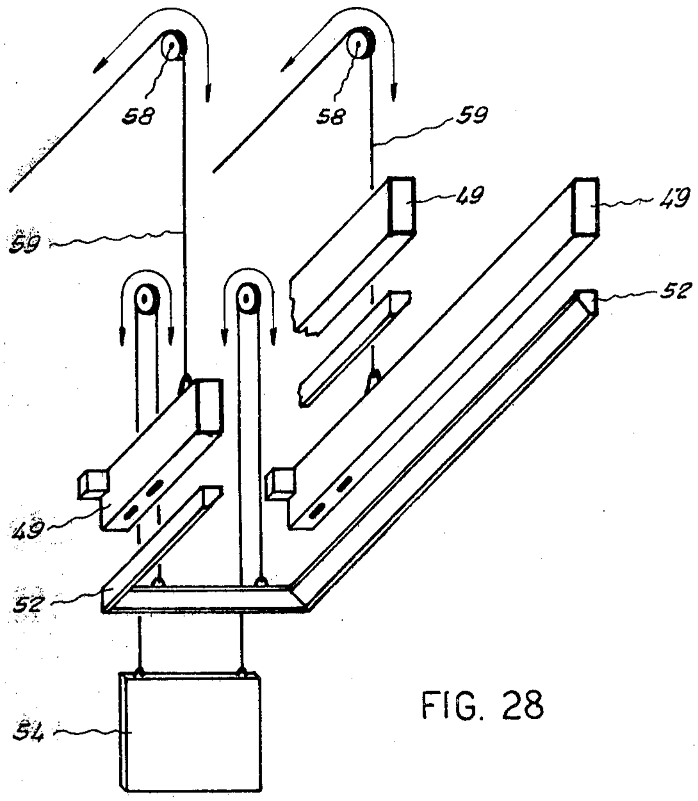
Figure 31:
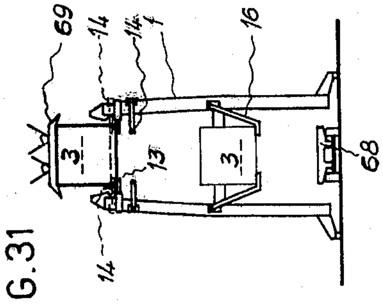

FIG. 28 is a schematic and interrupted perspective view of the kinematic motion with counterweight regarding the movement of the pairs of longitudinal beams and of the corresponding hanging frame according to FIGS. 19 and 21.

FIG. 29 is a perspective view of the rope or cable layout concerning the "low path" of the pairs of longitudinal container support beams.

FIG. 30 is analogous with FIG. 29 concerning the frame supporting the pair of head cross beams relative to the "high path" of the elevator of FIGS. 17 and 18.

FIGS. 31 to 36 represent in front elevation the phases concerning the elevator version of the type with grabbing at the bottom (FIGS. 1 to 16) during the unloading operations. The figures from 37 to 42 represent analogously with those from 31 to 36 the phases concerning the use of the same elevator version, however during the loading operations; in both series of figures, from 31 to 36 and from 37 to 42, the following sequences of the containers are shown: with thick lines the container subject of transfer, with thin lines the containers, which follow or precede in the cycle, and with dashed lines the position of the container itself following to the one indicated with thick lines.

Figure 43:
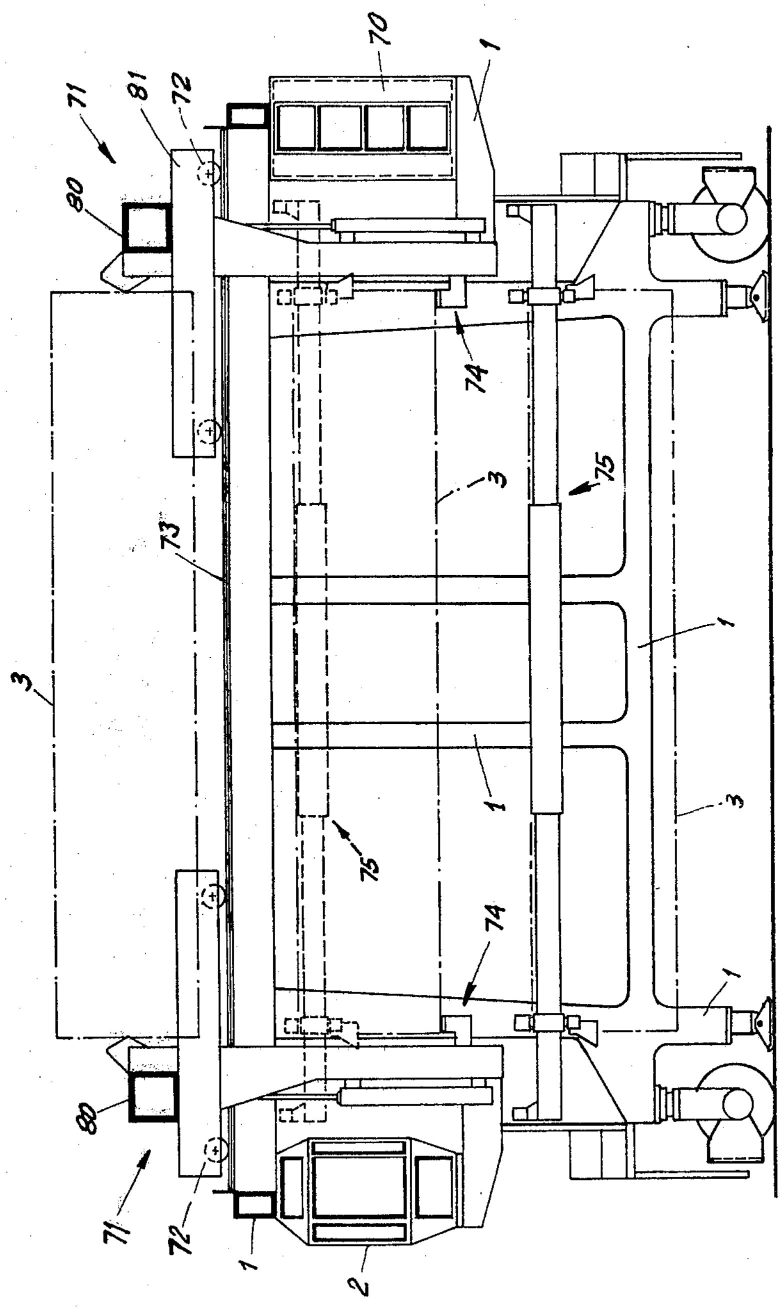

FIG. 43 is a schematic longitudinal vertical section of an elevator suitable for the transfer of containers of any length and equipped at the top with a pair of frames that can be positioned longitudinally, extended toward the bottom in order to support and handle containers of different lengths; this section shows the "low path" device and the container support element in the intermediate position in the case of handling of containers of maximum length.

Figure 44:
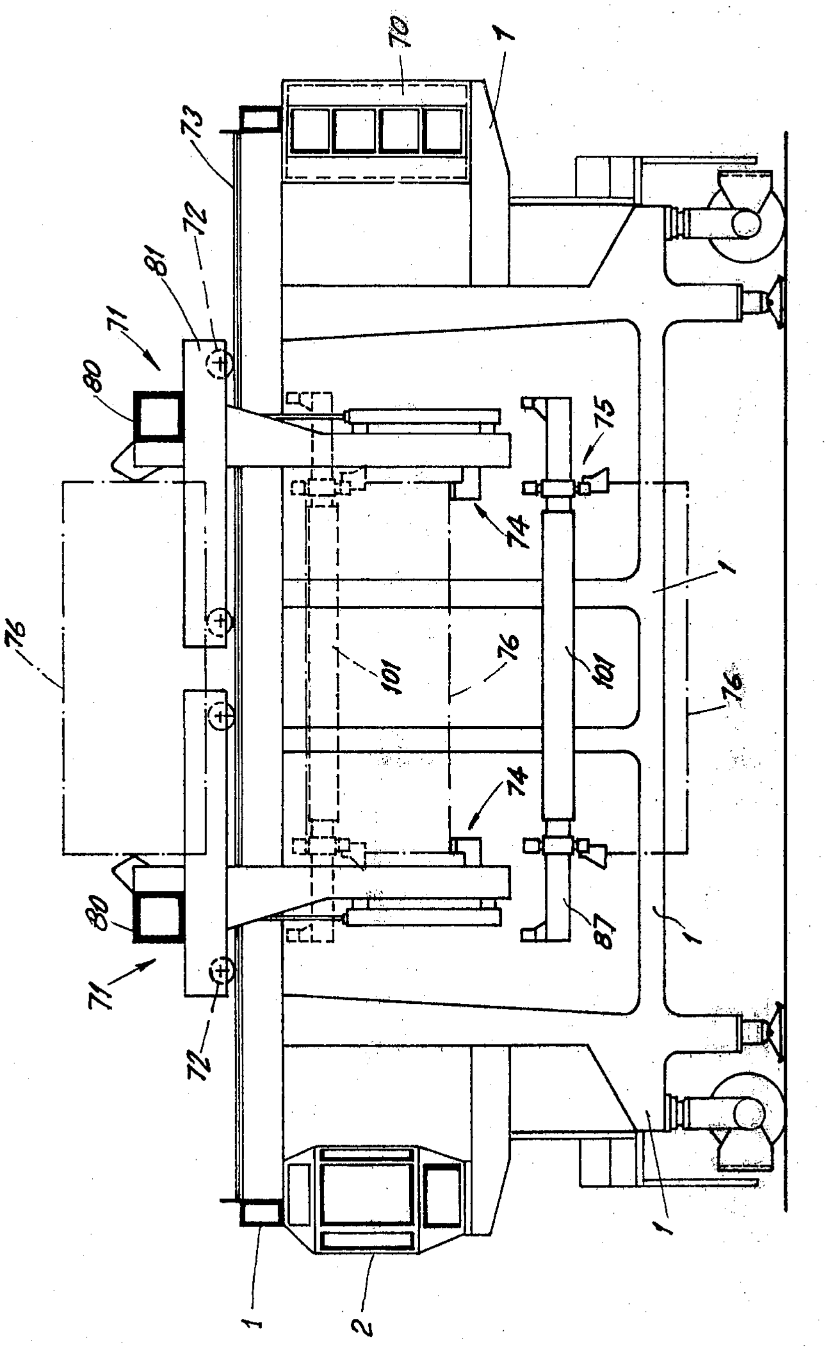

FIG. 44 is a section like the one of FIG. 43, however concerning the handling of a container of minor length.

Figure 45:
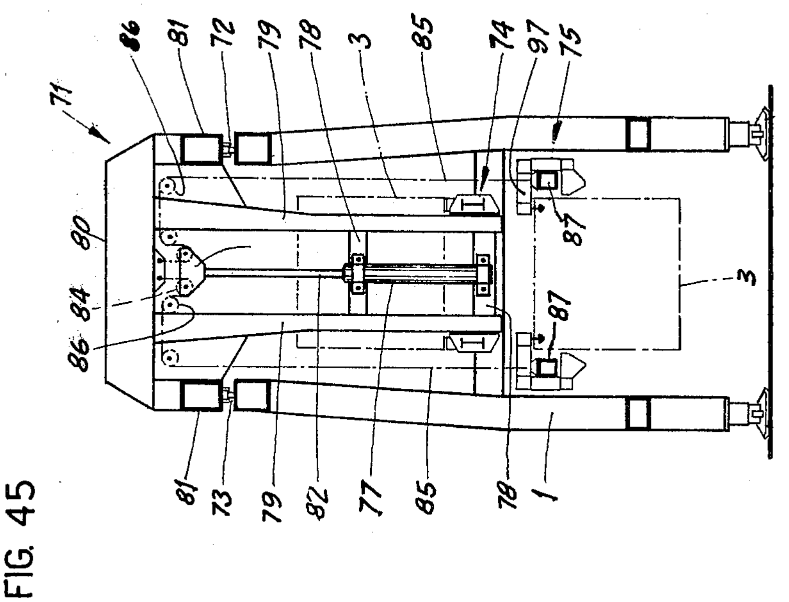

FIG. 45 is a vertical cross section of the elevator of FIG. 43: in one of the two mobile frames (that is frames that can be positioned longitudinally) the "low path"

device is indicated together with the container support element in the intermediate position.

Figure 46:
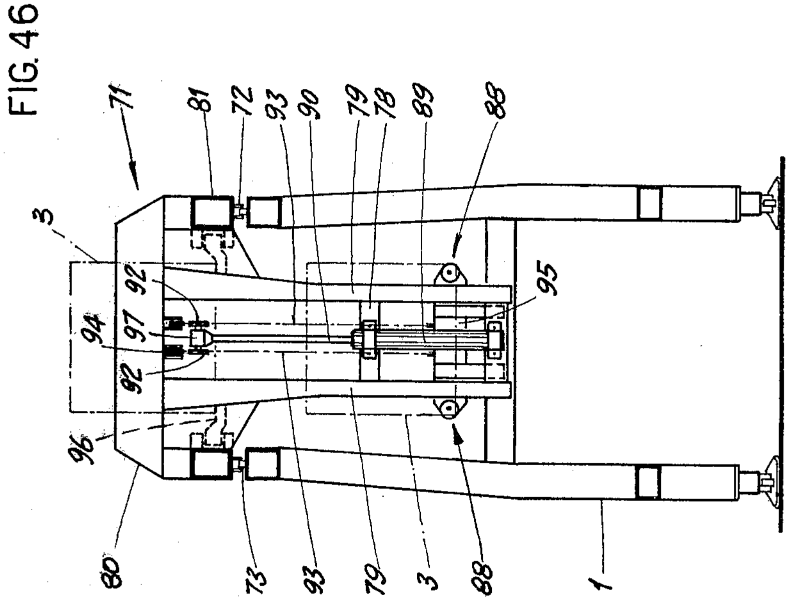

FIG. 46 is a vertical section like that of FIG. 45, in which the mobile frame presents the indication of the "high path" device: at the top the container support device at the couples of mobile frames is indicated with dashed lines, when it is in the upper position.

Figure 47:
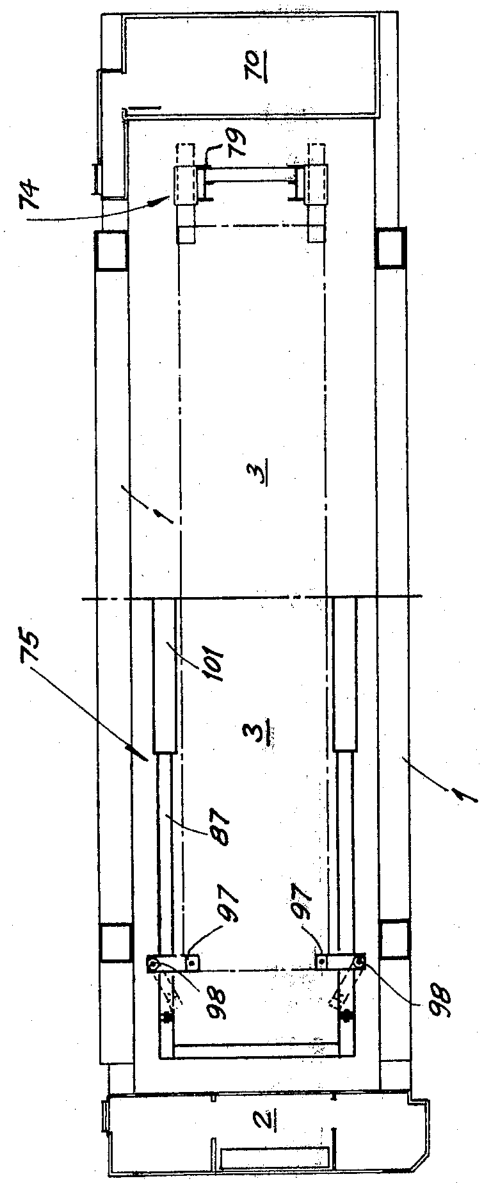

FIG. 47 is a schematic horizontal section of the elevator in the situation of FIG. 45 divided into two parts: the left part representing schematically the left part of the low path grabbing device, the right part instead indicating the right part of the container support element in the intermediate position.

Figure 48:
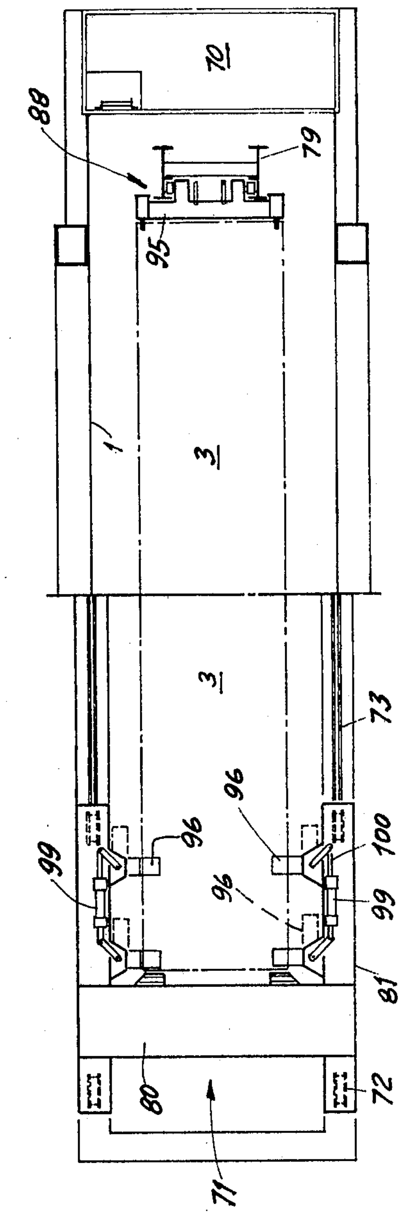

FIG. 48, concerning the situation of FIG. 46 is on the left a view from above of the elevator with the left part of the container support device in the upper position, whereas the right part is a horizontal section indicating the right part of the grabbing device of the high path.

Figures 49, 50, 51, 52:
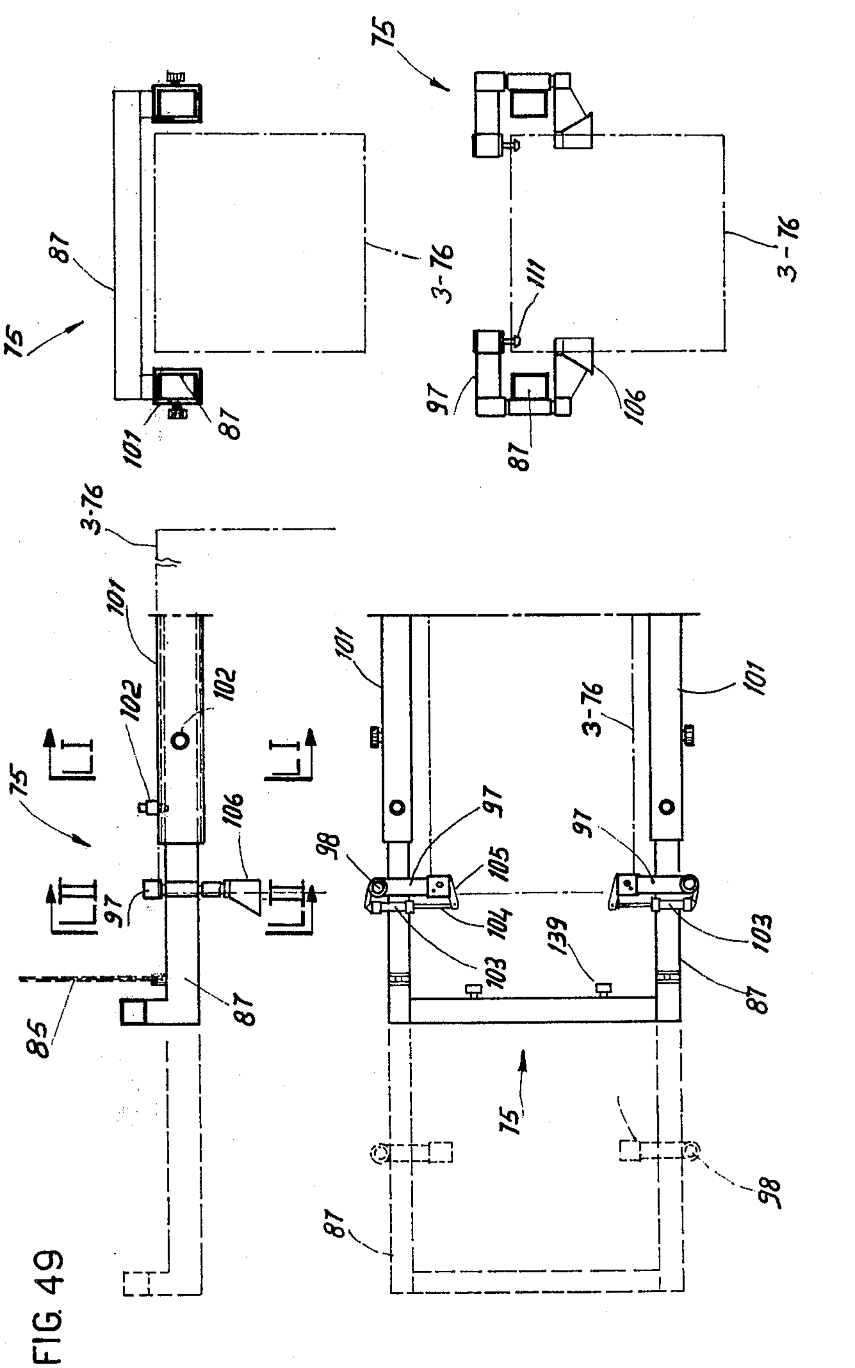

FIG. 49 is a vertical section of the longitudinally telescopic device of the low path, limited to one half of same.

FIG. 50 is the plan view of FIG. 49.

FIG. 51 is the vertical cross section LI—LI of FIG. 49.

FIG. 52 is the vertical cross section LII—LII of FIG. 49.

Figure 53:
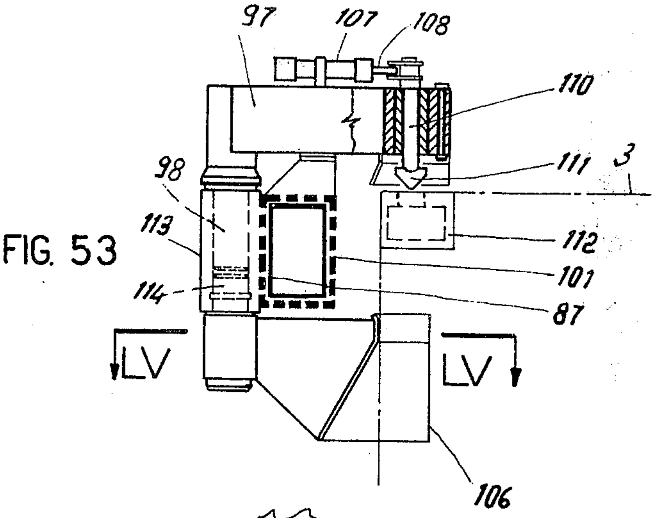

FIG. 53 is a part section of the grabbing element assembled on the low path device.

Figure 54:
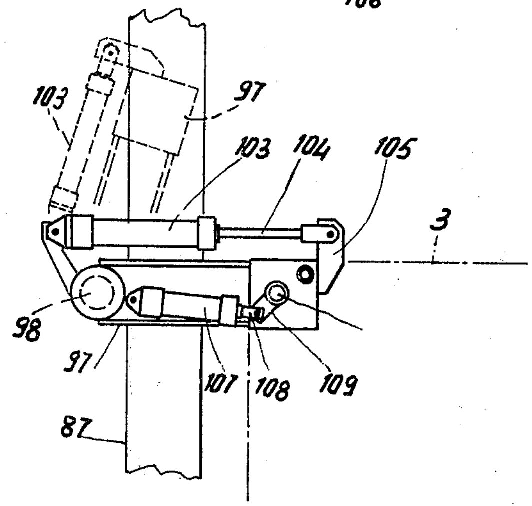

FIG. 54 is the plan view of FIG. 53.

Figure 55:
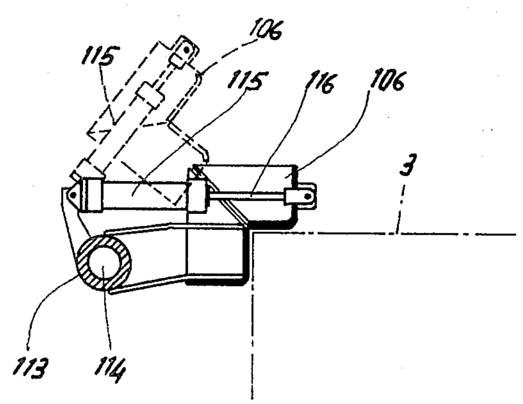

FIG. 55 is the section LV—LV of FIG. 53.

Figure 56:
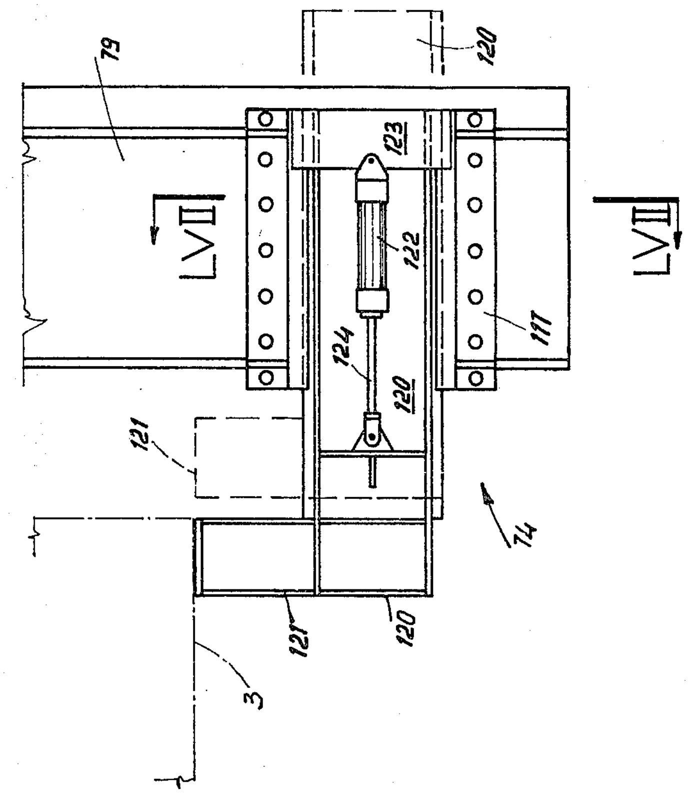

FIG. 56 is a side view in elevation of the support element of the intermediate position.

Figure 57:
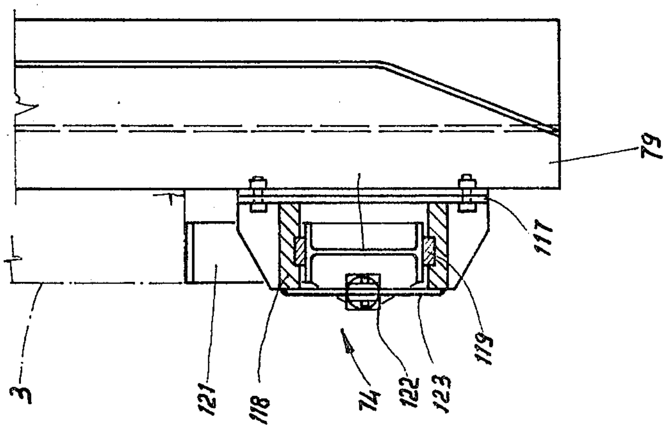

FIG. 57 is the section LVII—LVII of FIG. 56.

Figure 58:
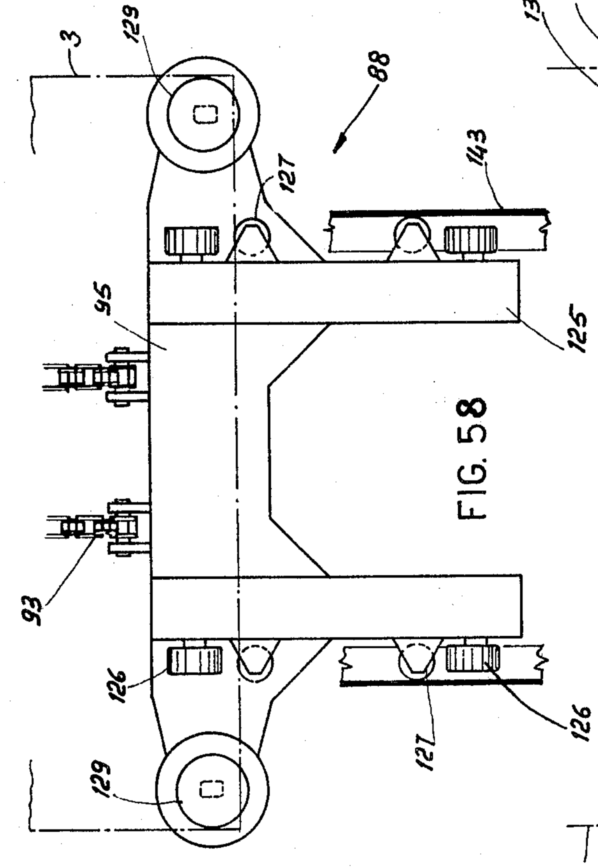

FIG. 58 is a view in elevation of the vertically movable slide regarding the high path device.

Figure 59:
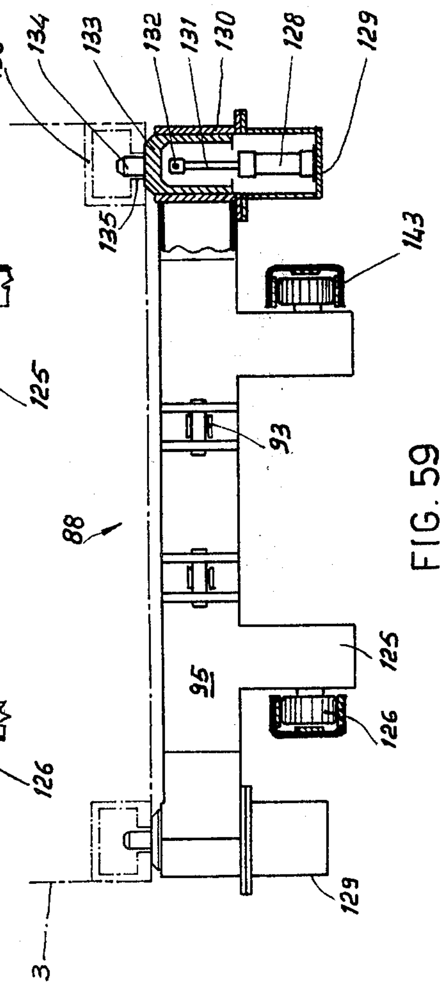

FIG. 59 is the plan view of FIG. 58.

Figure 60:
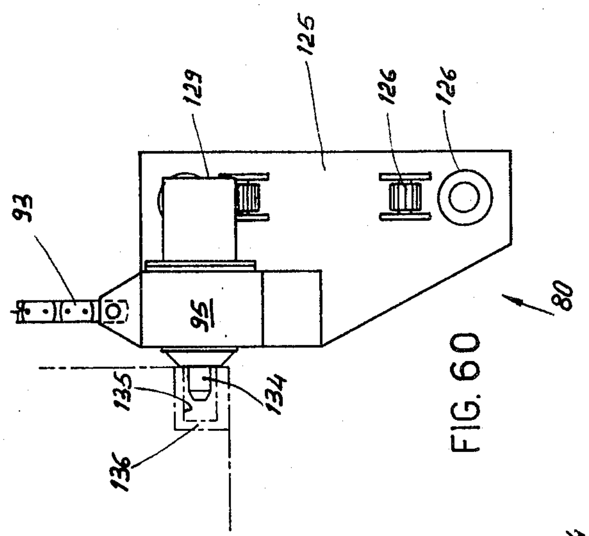

FIG. 60 is the left side view of FIG. 58.

Figure 61:
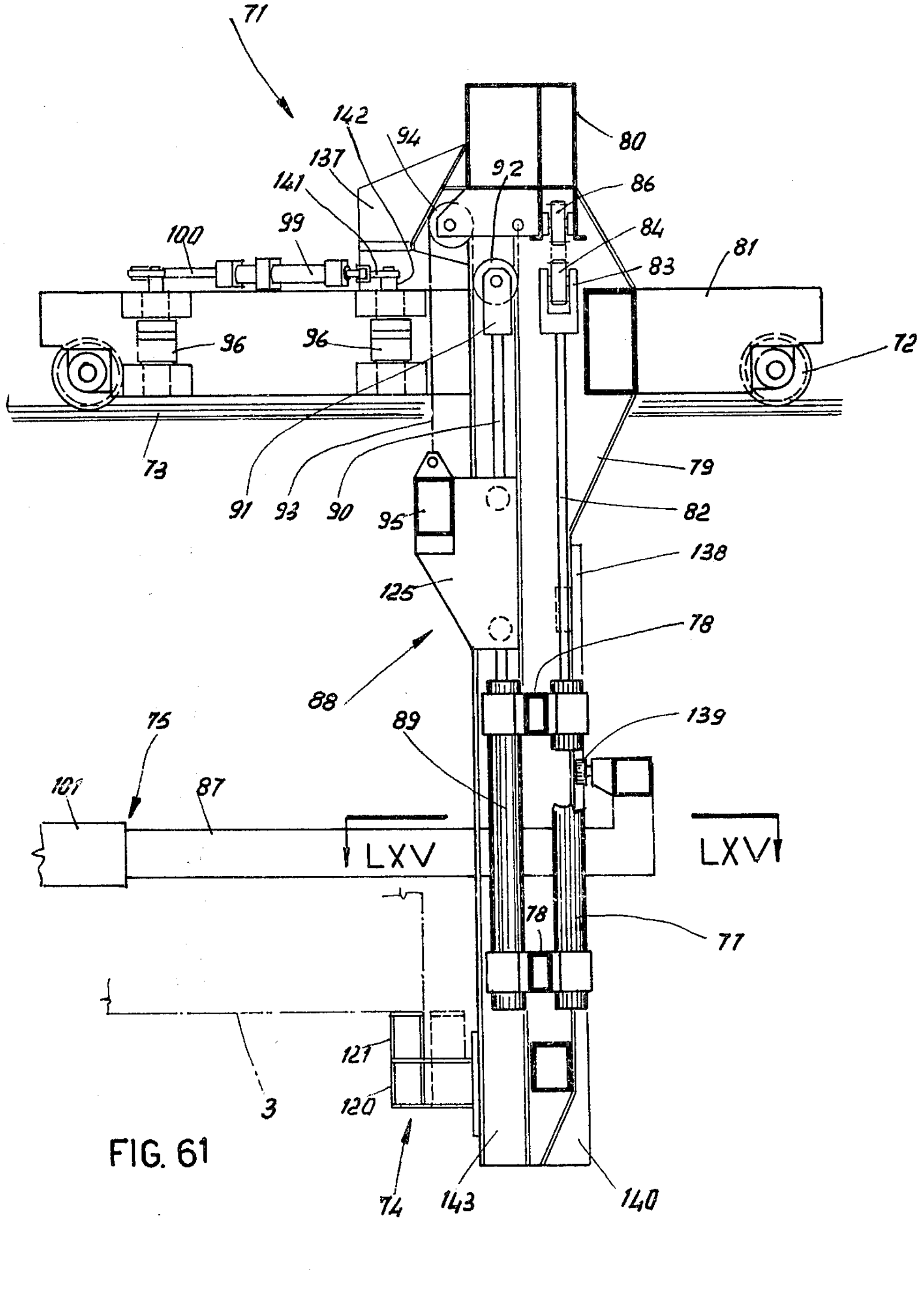

FIG. 61 is a vertical section of one of the two movable frames with the high path and low path devices.

Figure 62:
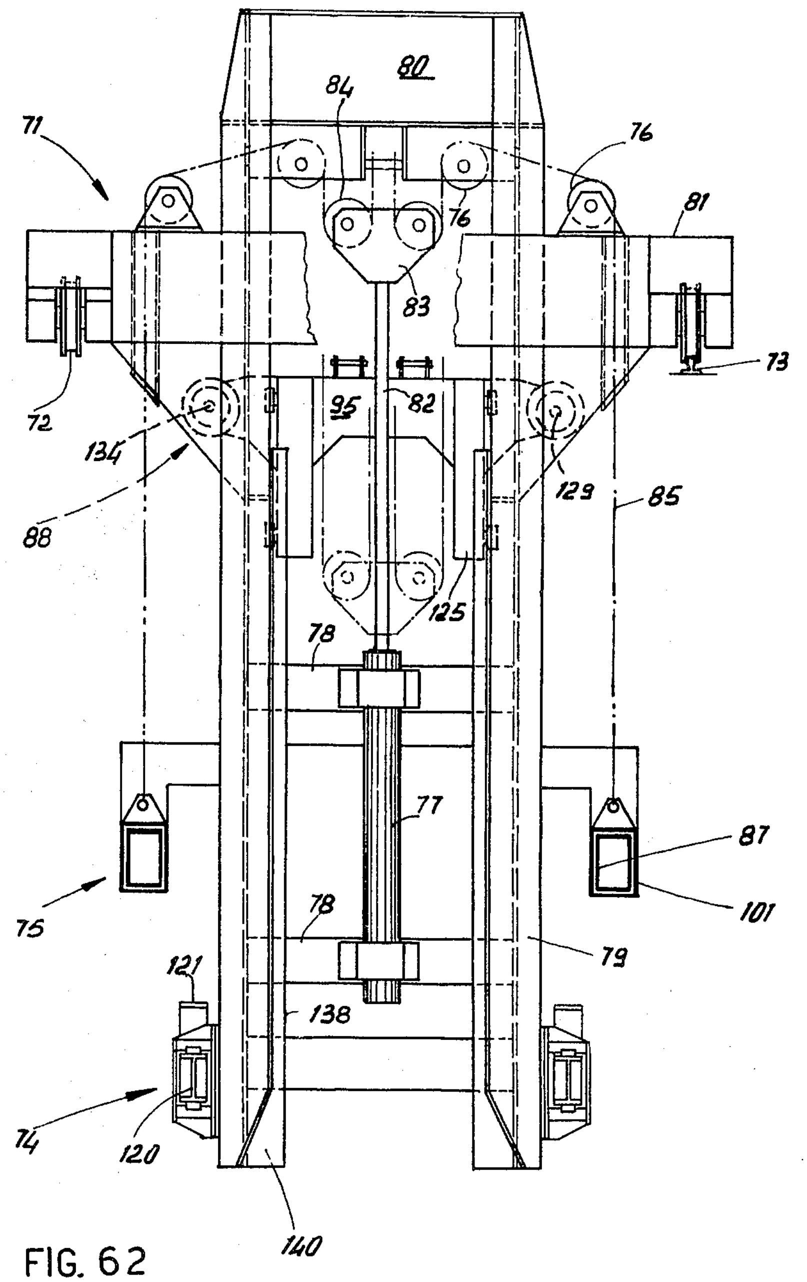

FIG. 62 is the right hand view of FIG. 61.

Figure 63:
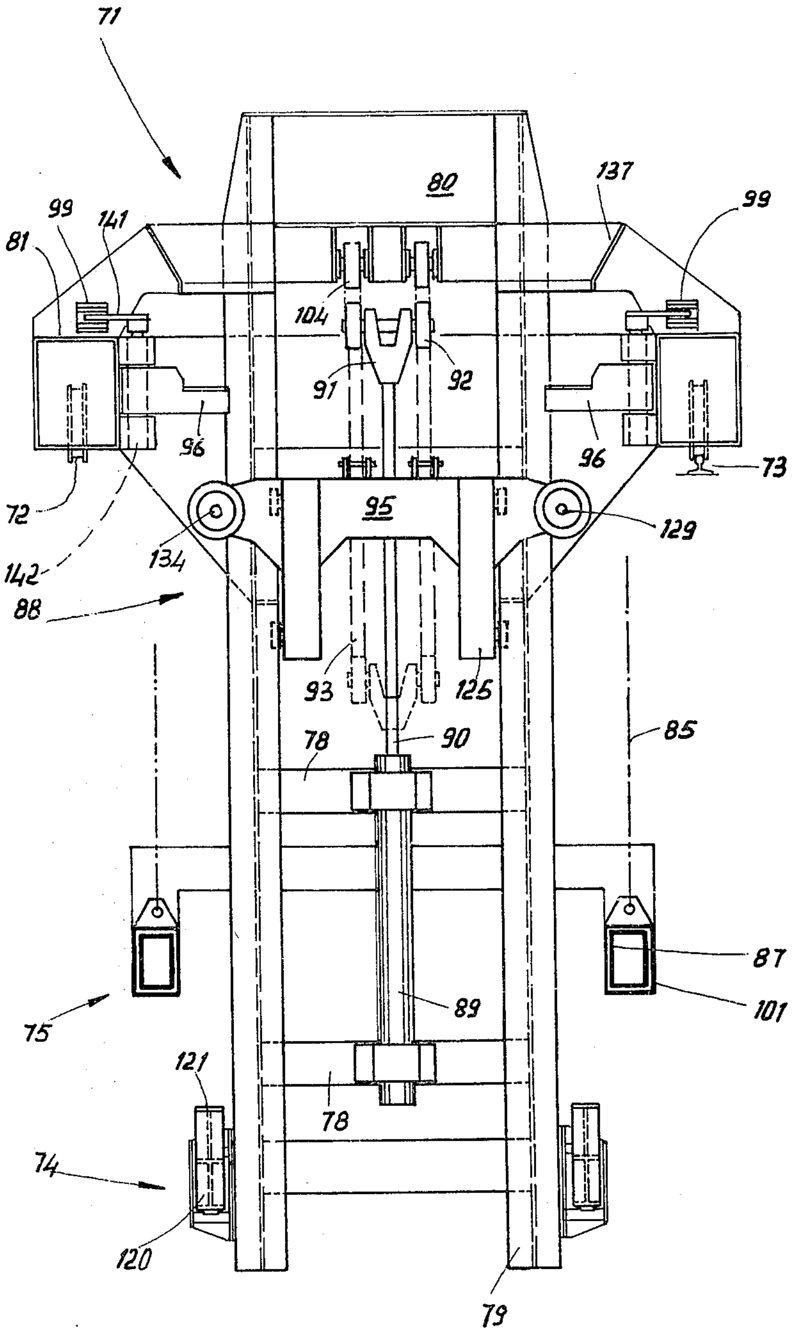

FIG. 63 is the left hand view of FIG. 62.

Figure 64:
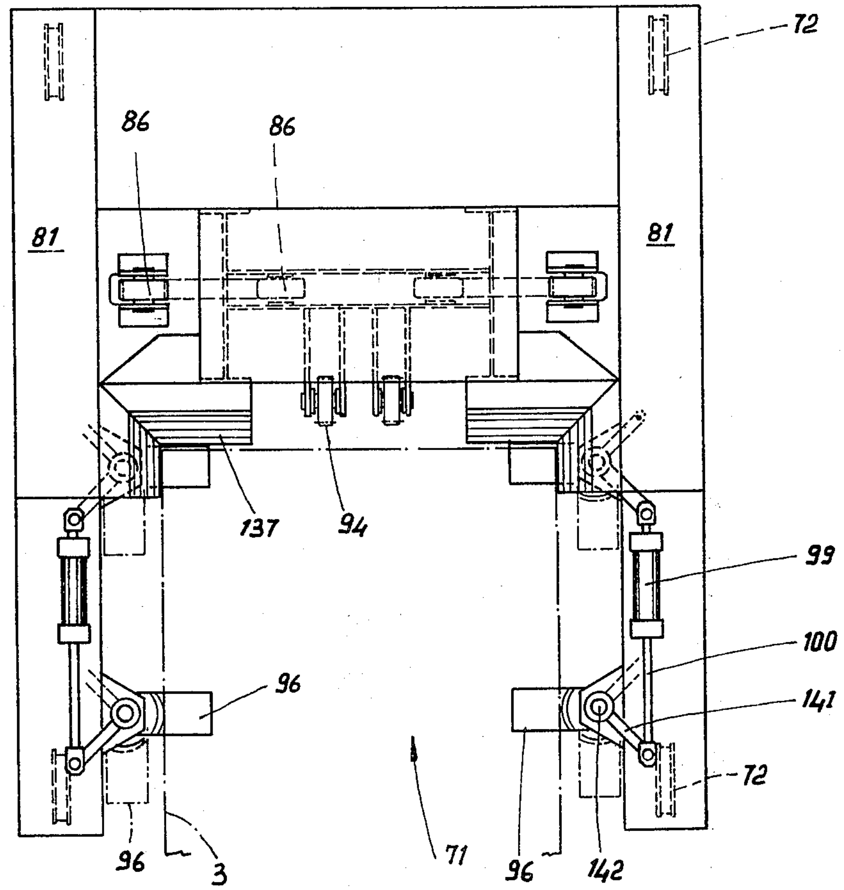

FIG. 64 is a view from above of one of the two movable frames with the container grabbing and support device in the top position.

Figure 65:
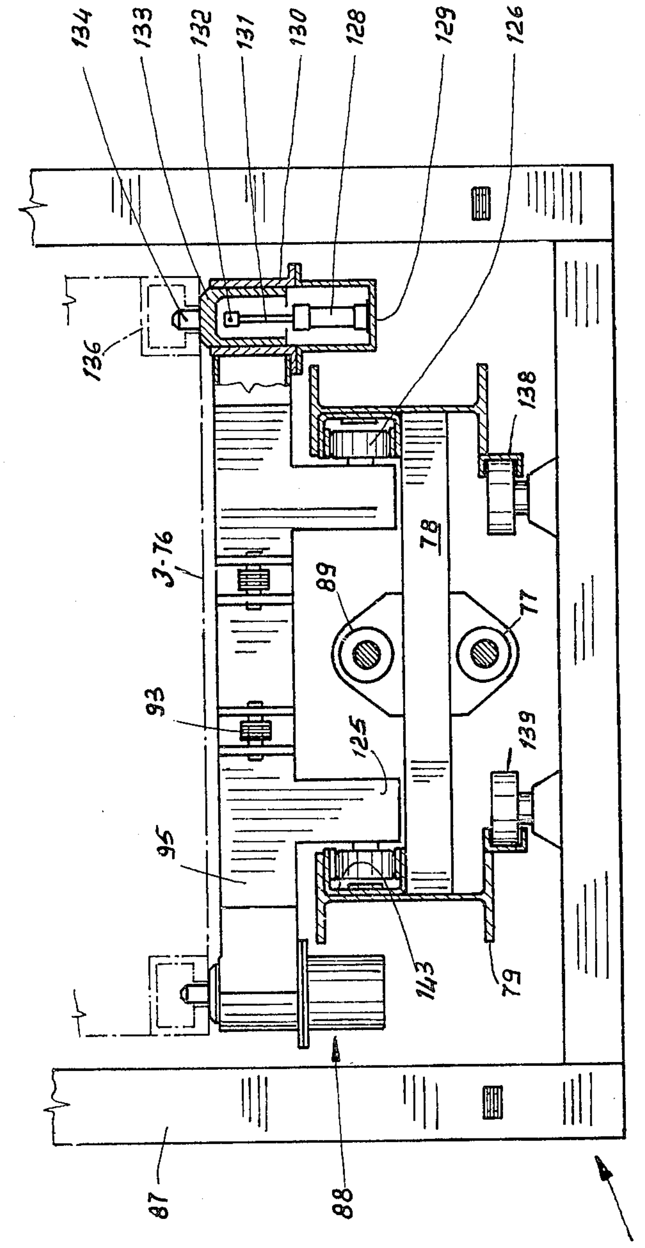

FIG. 65 is the horizontal section LXV—LXV of FIG. 61 intendded to show the slide regarding the high path and the guides of the low path device.

Figure 66:
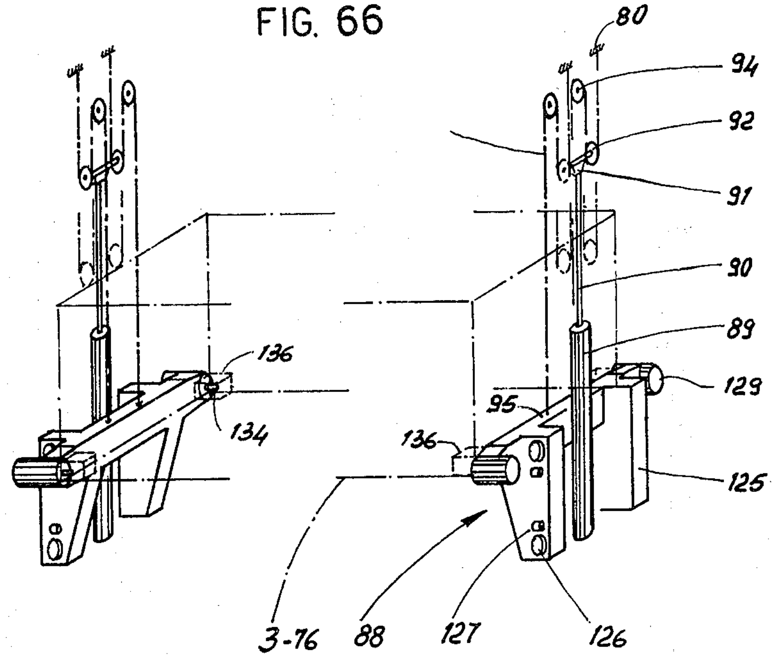

FIG. 66 is a perspective view of the device with slide pairs concerning the high path.

Figure 67:
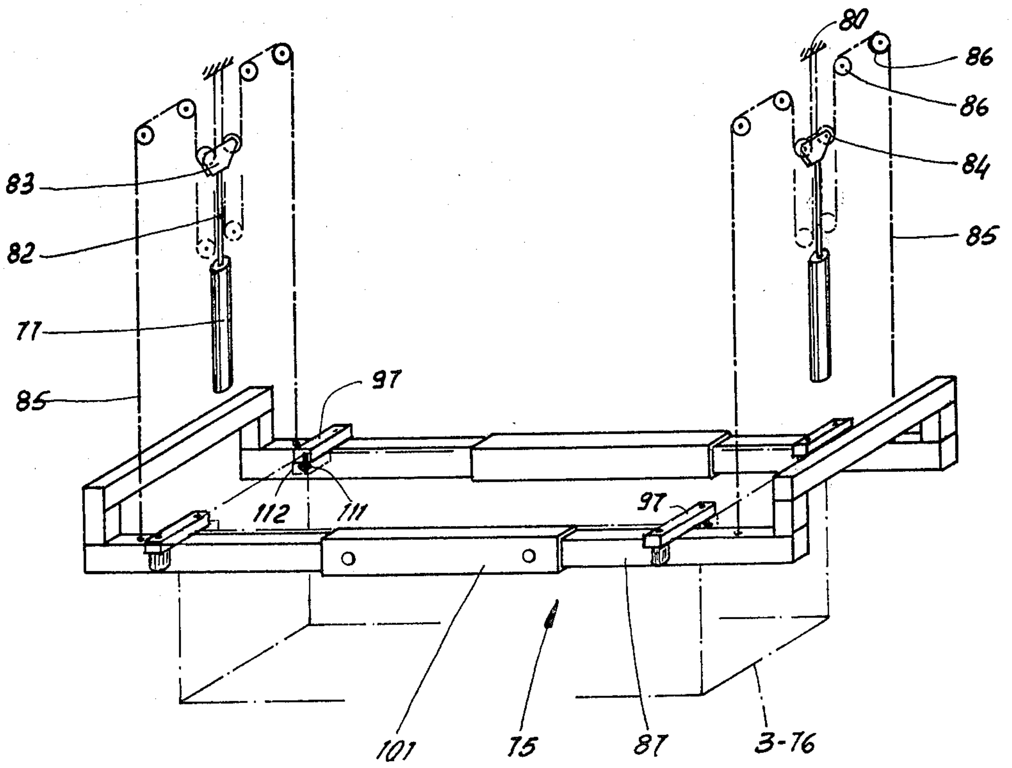

FIG. 67 is a perspective view of the telescope device of the low path.

Figures 68, 69, 70:
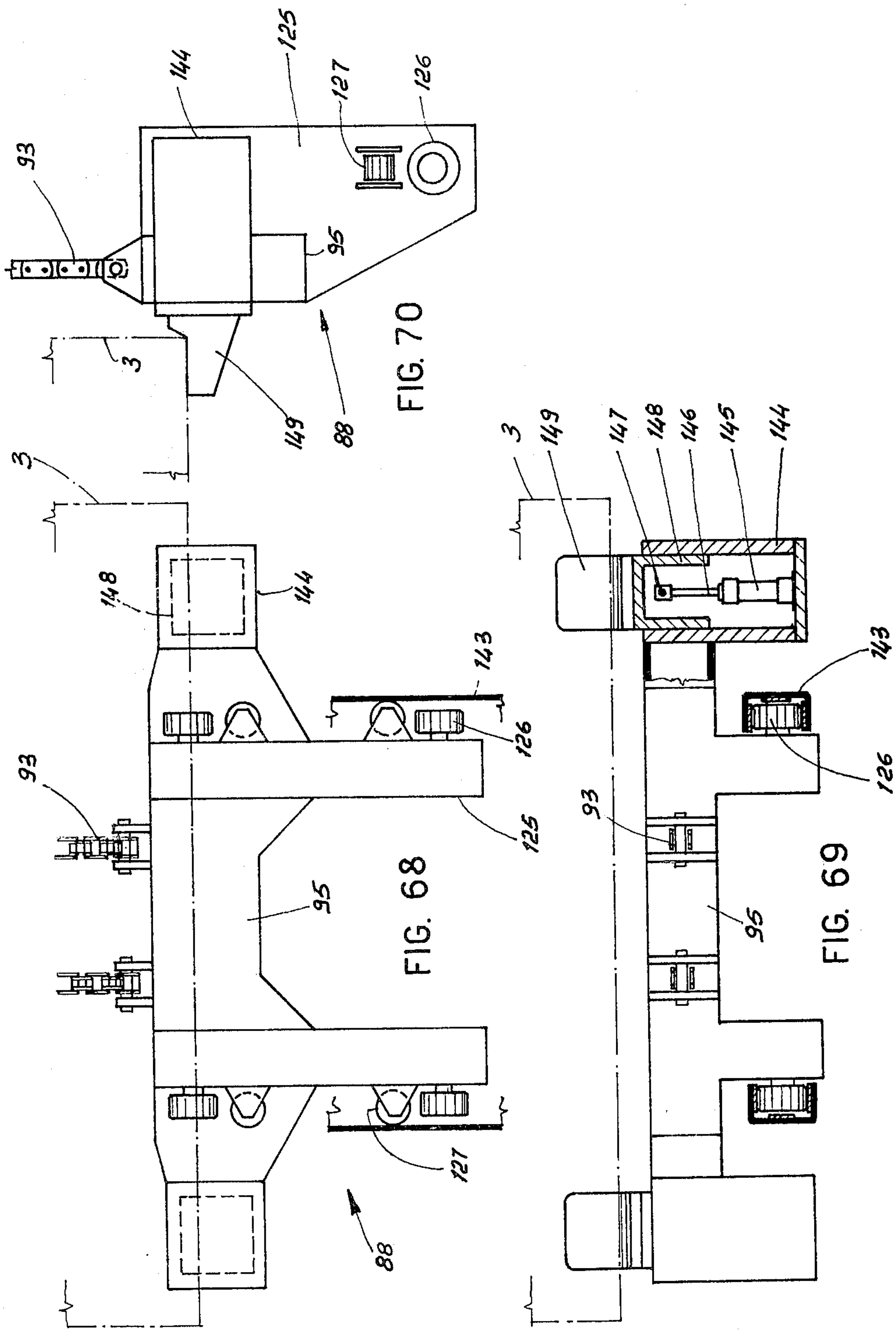

FIGS. 68, 69, 70 correspond to FIGS. 58, 59, 60, however in the case of a variation contemplating the replacement of the grabbing of the container by means of stakes in the corner blocks by a bracket or fork support device, which can be adopted in particular cases.

Figure 71:
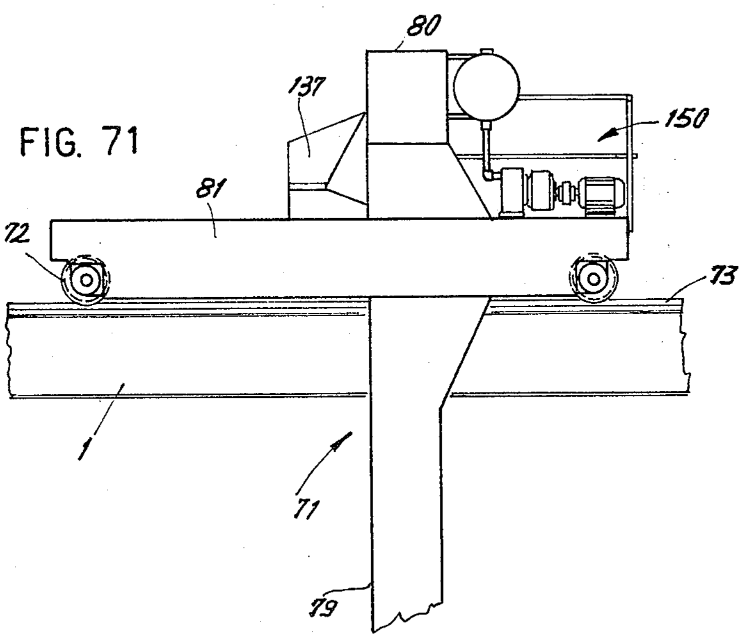

FIG. 71 is a partial side view of the movable frame indicating the hydraulic station fixed to each of said movable frames.

Figure 72:
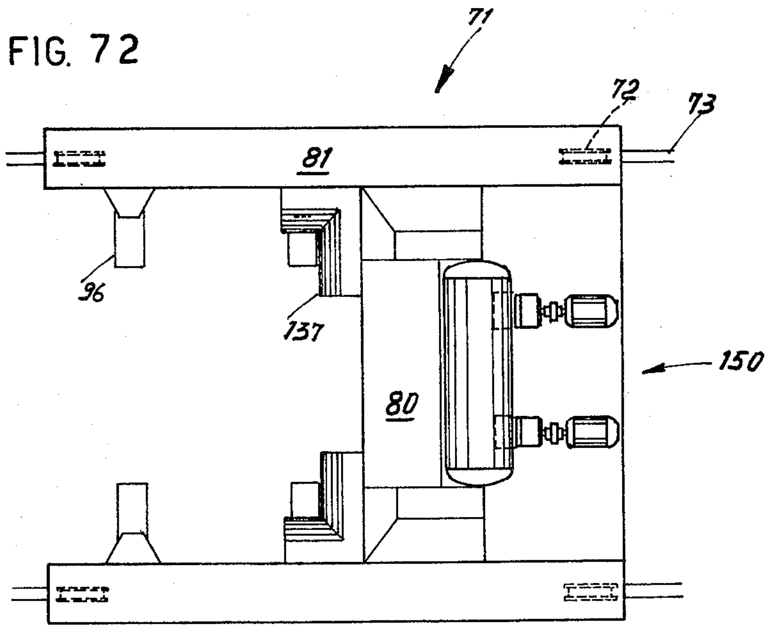

FIG. 72 is the plan view of FIG. 71.

Figure 73:
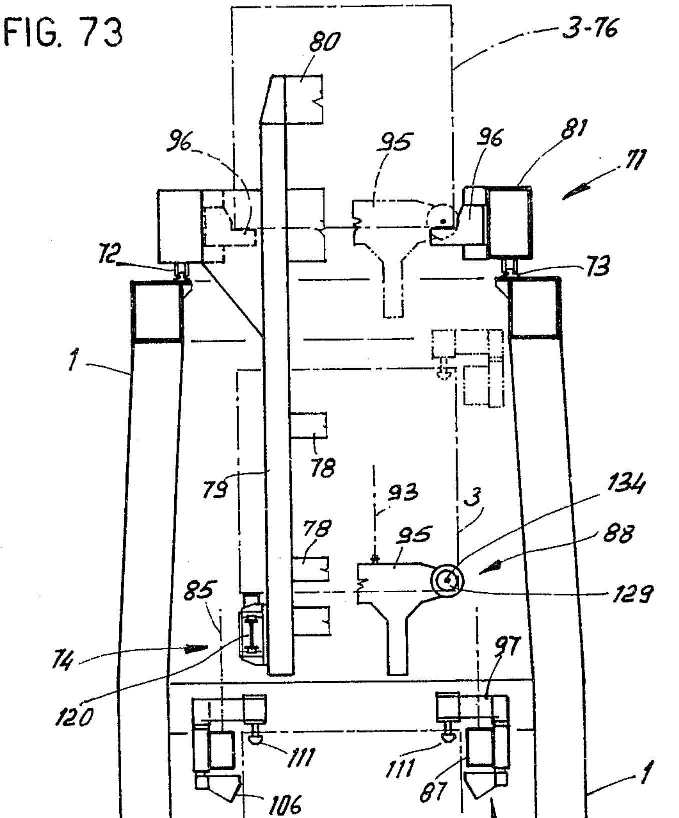

FIG. 73 is a schematic and interrupted vertical cross section of the elevator in order to show the reciprocal positions of the container support and handling elements in the three positions: top, intermediate and bottom.

Figure 74:
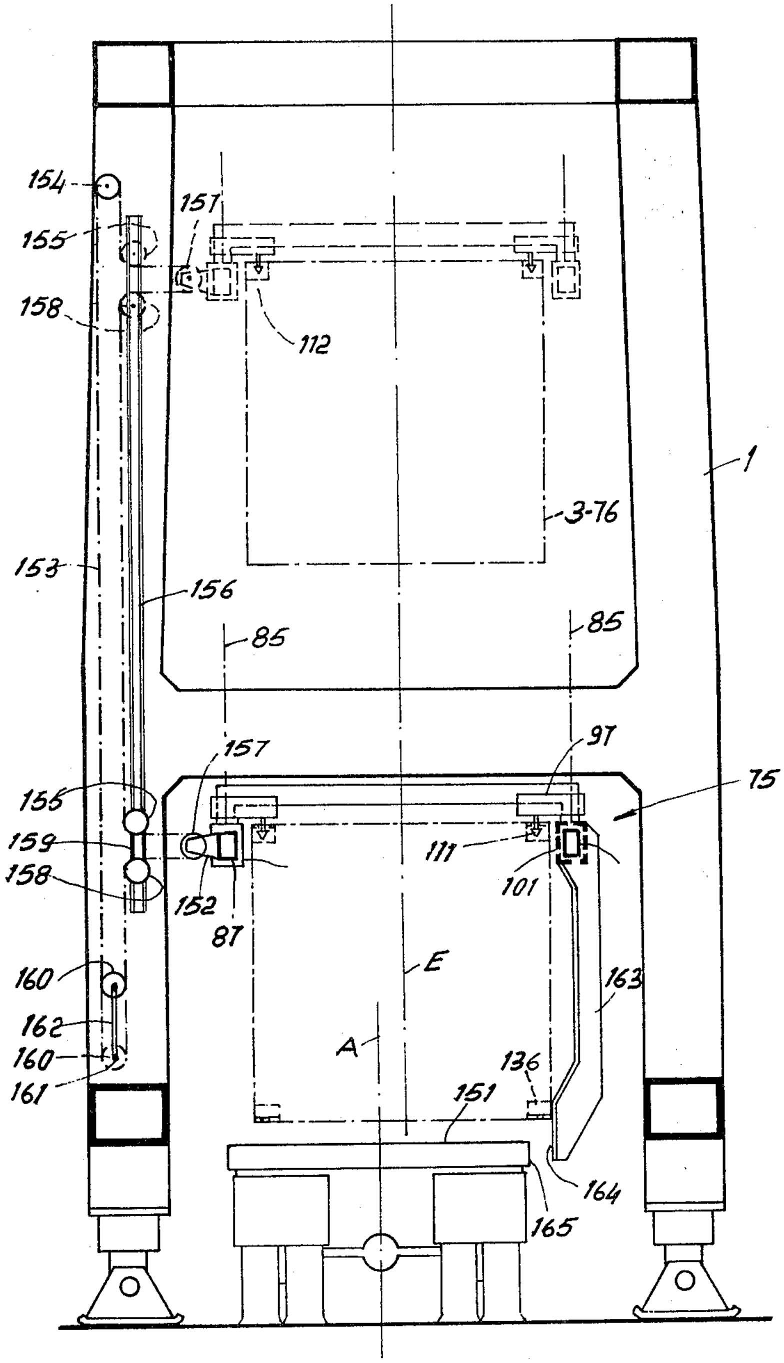

FIG. 74 is a partial vertical cross section of the elevator equipped with a device for the transverse centering of the container on the loading bed of a road trailer, which in this particular case is moved sideways compared with the centre line of the tunnel.

Figure 76:
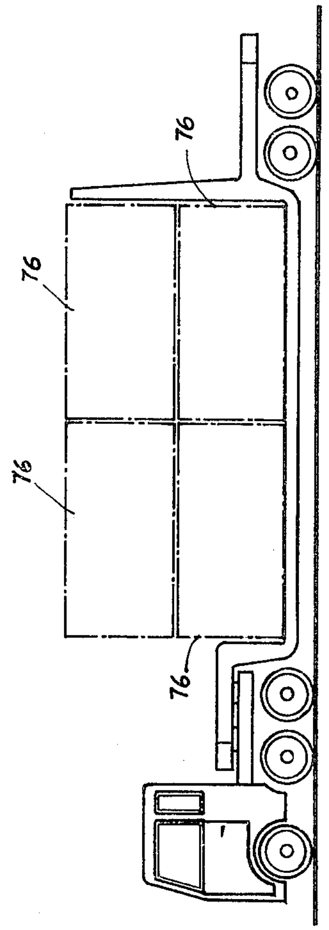
Figure 75:
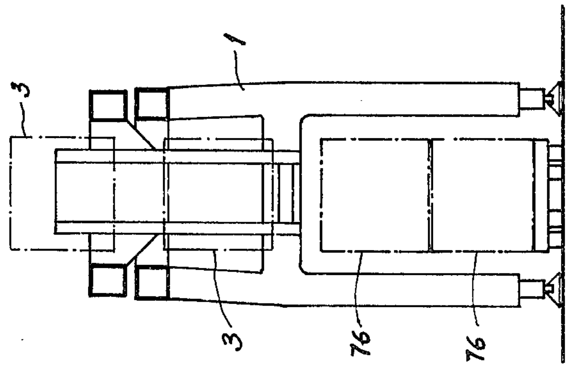

FIG. 75 is a schematic front view of a variation contemplating the extension of the lower part of the elevator masts with consequent raising of the gallery opening in order to permit the entrance of special trailers suitable for the transport of superimposed container pairs as indicated in FIG. 76.

Figure 77:
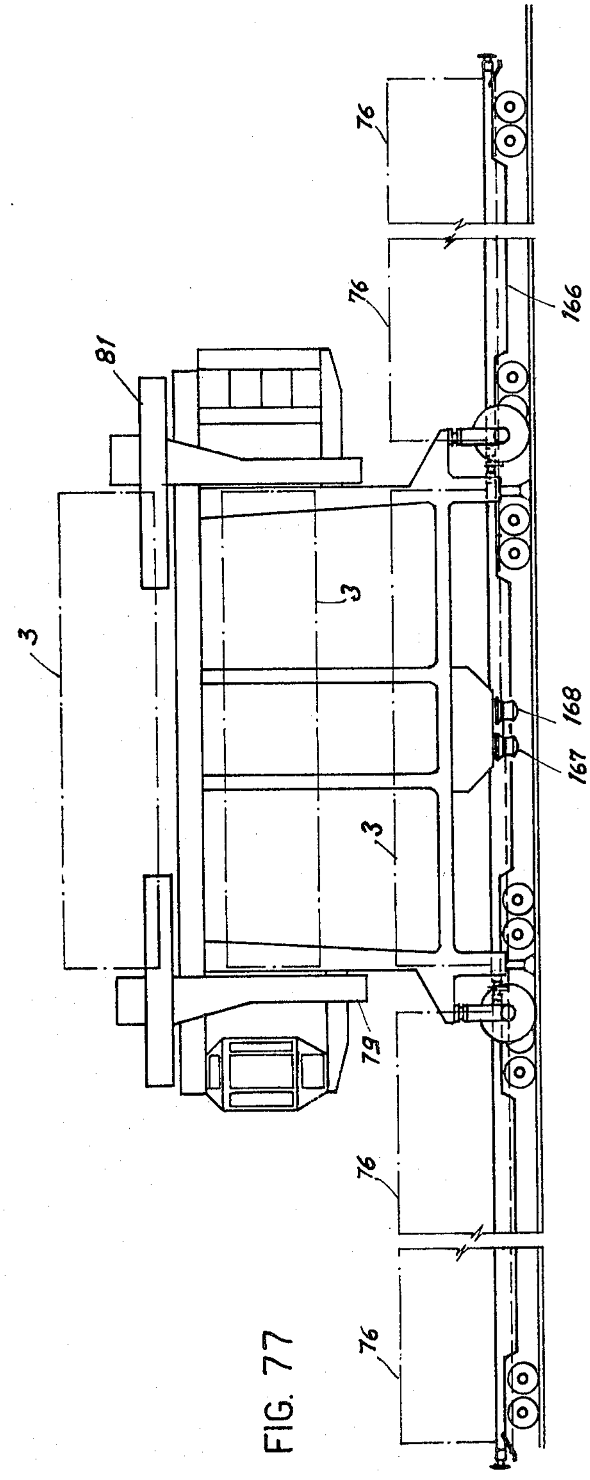
Figure 78:
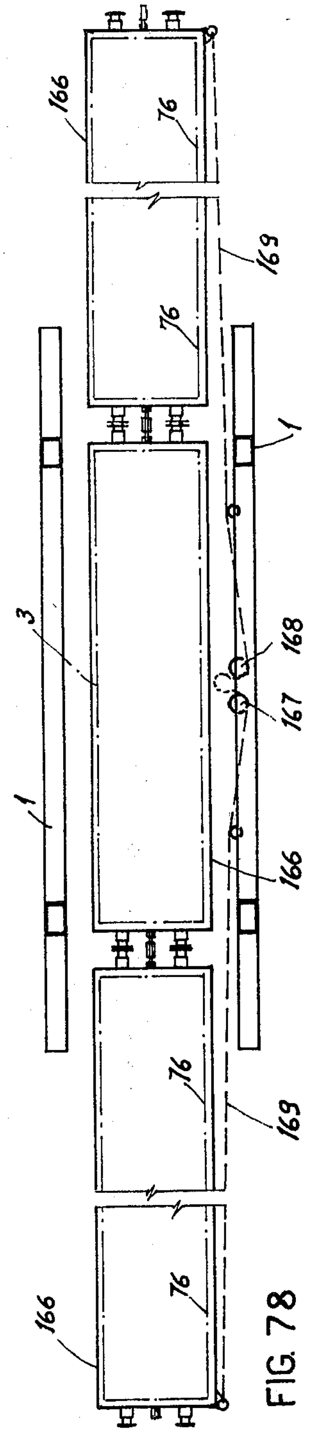

FIGS. 77 and 78 are respectively a schematic vertical and horizontal section regarding the case of container transfer from and to railway wagons.

Figure 79:
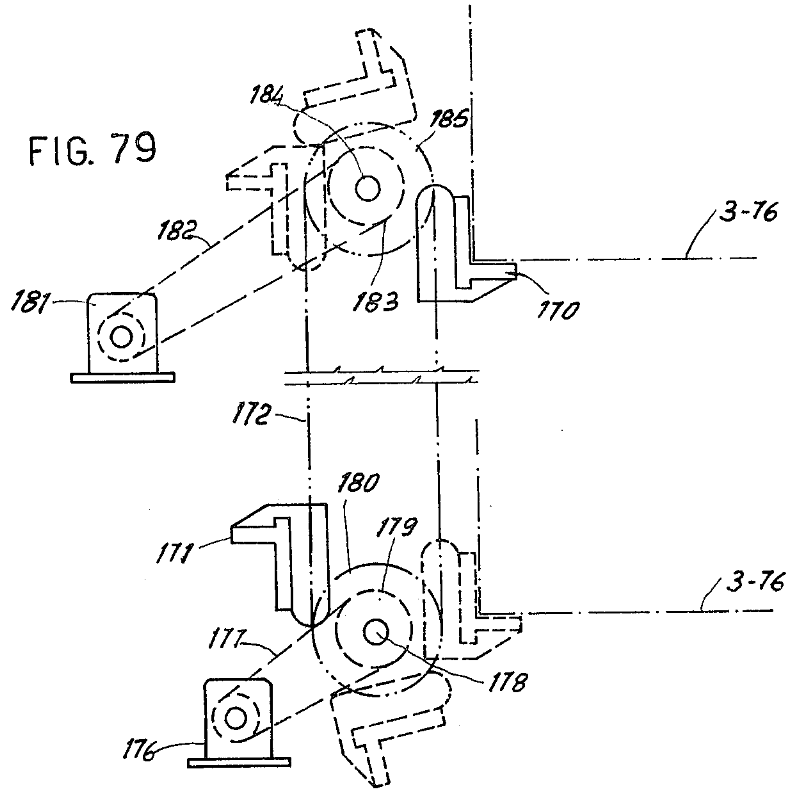

FIGS. 79, 80, 81, 82 represent a variation of the high path device carried out in the shape of a paternoster: FIG. 79 is a schematic side view of the paternoster elevator equipped with two pairs of vertical chains on each side, each of which carrying a pair of supports for the container.

Figure 80:
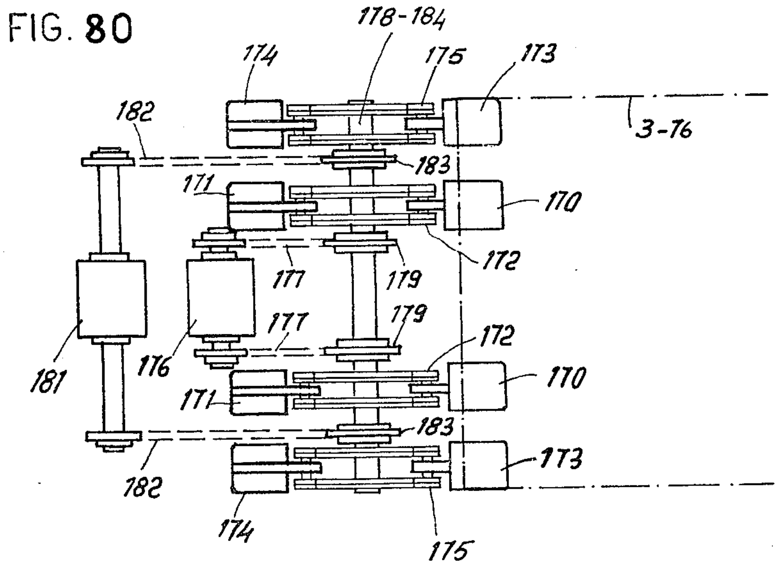

FIG. 80 is the plan view of FIG. 79.

Figure 81:
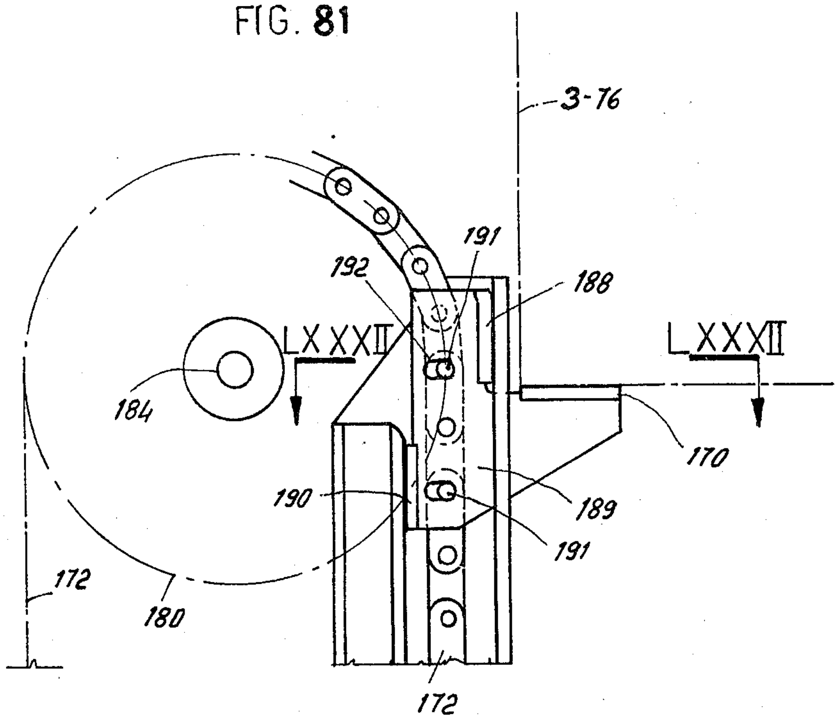

FIG. 81 illustrates expanded details of the upper part of FIG. 79 in order to show the guide of the container support.

Figure 82:
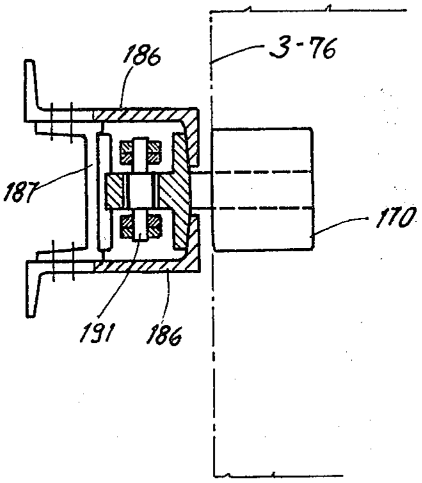

FIG. 82 is the cross section LXXXII—LXXXII of FIG. 81.

DETAILED DESCRIPTION OF THE PREFERRED EMBODIMENT

Referring to the drawings, the various numerical elements are described as follows: 1 is the elevator framework; 2 is the operator cabin in the case of self-propelled elevators and 3 indicates the containers. Numerals 4 and 5 indicate rear brackets respectively to support the pumps of the hydraulic control and supervision circuit and to support the diesel engine-pump unit for the transfer of the self-propelled machine. Numeral 6 indicates the hydraulic operation cylinders arranged on both sides relative to the "low path", 7 the operation cylinders relative to the "high path". The numeral 8 indicates the slides operated by the cylinders 6; 9 indicates the slides operated by the cylinders 7 relative to the "high path" and 10 (FIGS. 2 and 3) is a bridge crane, which carries out the transfer of the containers 3 from the ship to the quay and vice versa. The numerals 11 and 12 (FIG. 4) are two pairs of sheet metal elements restrained to the framework 1 in order to represent an invitation and guide to the entrance of the container 3 from the top the pair 12 being movable according to the different lengths of the container 3. Numeral 13 indicates the retractable supports of the container 3 at the summit (or tafferel); 14 indicates brackets retractable sideways because of their rotation around the pivot 15, forming the support of the container during its "high path". Reference numeral 16 (FIG. 5) is a pair of arms hinged at 17 to the corresponding slides 8 vertically guided along the masts 19 of the framework 1 relative to the "low path". Numeral 20 indicates hydraulic double-acting operation cylinders hinged at 21 to the slide 8 in order to place the articulated support shoes 22 in the support position for container 3 and to retract them, while 24 indicates stanchions of the framework 1 relative to the guide of the slide 9 during the "high path". Numeral 25 (FIGS. 8 and 9) is a double-acting hydraulic operation cylinder operating the retractable support 13 equipped at its end with a safety feeler point 26 capable of blocking the rod 27 in its extended position up to the moment, where the container 3 rests on the feeler point. Numerals 18 and 23 indicate respectively the square section part of the guide of the retractable support 13 and the part of the cylinder 25 casing, both fastened to the framework 1. Numeral 28 (FIGS. 10 and 11) indicate the rods of the side pistons 29 of the cylinder units 6 and 7, restrained at both ends respectively to the upper and lower longitudinal member of the framework 1. Numeral 30 is the central piston rod, restrained to the guides 8 for the "low path" and 9 for the "high path"; 32 (FIGS. 12 and 13) is a double-acting hydraulic operation cylinder hinged to the appendix 33 of the slide 9, the rod 34 of which operates the parallelogram 35, 36, 37 in order to obtain the rotation of the retractable brackets 14. Numeral 38 indicates feelers applied to the brackets 14 in order to avoid the coming out of the rod 34 as long as the container 3 rests on the feelers. Numerals 39 and 40 (FIGS. 14 and 15) indicate two articulation hinges, respectively horizontal and vertical, of the shoe 22 to the square 41 and of the shoe 22 to the arm 16. Numeral 42 indicates a feeler for each of the four container 3 support squares 41, which interrupts the stroke of the corresponding arm 16 as soon as the feeler arrives at a contact with said container, while 43 (FIG. 17) is a horizontal perimeter frame for the support of the container during the high path by means of four valve units 44. Numeral 45 indicates the vertical guide pillars of the frame 43 fastened to the framework 1; 46 indicates the lugs of the frame 43 for the anchorage of the operation ropes or cables connected with the corresponding winch 47. Numeral 48 is a winch for the operation of the four maneuvering cables of the two longitudinal beams 49 of the "low path" (FIG. 18) vertically movable in the guides 50 fastened to the framework 1. Numeral indicates the attachments of the four above-said cables to the beams 49, while 52 is a hanging perimeter frame with trapezoidal section, widened and open towards the bottom so as to form a lead-in on the upper rim of the container 3. Numeral 53 indicates the four attachments for the frame 52 support cables, linked to the two counterweights 54 sliding in pairs of vertical guides 55 fastened to the two heads of the framework 1. Preferred numeral 56 indicates the upper stroke end stops of the frame 52 maintained towards the top by the established excess weight of the counterweight 54. Numeral 57 (FIG. 20) is the grabbing of the containers 3 in the bottom corner blocks; 58 (FIG. 19) indicates the cable return pulleys 59 of the "low path" moved by the winch 48. Numeral 60 (FIG. 20) indicates the cable (61) return pulleys of the "high path" operated by the winch 47; 62 (FIG. 24) is a guide piston of the double-acting hydraulic cylinder 63 fastened to the cross beams of the head of the frame 43. Numeral 64 is a cylinder fastened to said cross beams of the frame 43 in order to guide the piston 62 equipped with a shutter 65, which penetrates into the slot 66 of each bottom corner block of the container 3. Numeral 67 (FIG. 27) is a shutter unit such as 44, fastened to the end of each beam 49, however intended for the grabbing in the four top corner blocks of the container 3. Numeral 58 (FIG. 31) indicates the truck trailer intended for the transport of the container 3, while 69 is the grabbing element of the crane 10. As for the elevator of FIGS. 43 to 82 the indications are the following: 70 (FIG. 43) is a rear cabin serving as engine room; 71 indicates a pair of longitudinally movable upper frames fastened to the framework 1 by means of devices not indicated, said upper frames equipped with devices for the high and low path are mounted onto wheel pairs 72 rolling on rails 73 fastened at the top of the framework 1. The frame pair 71 is destined to support containers of different length. Numeral 74 indicates two supporting elements of the container 3 in the intermediate position, being part of the lower area of the transversal sides 79 of each movable frame 71. Numeral 75 is the horizontal telescopic frame constituting the telescopic device of the low path, the parts of which can be fastened among each other. Numeral 76 (FIG. 44) indicates containers which are in any case shorter than the containers 3. Numeral 77 (FIG. 45) is an hydraulic operation cylinder fastened to the couple of cross members 78 of the pair of cross body sides 79 to the frame 71 extending towards the bottom, at the top interconnected by the cross beam 80. Reference numeral 81 indicates two pairs of supporting beams forming the upper longitudinal sides of each movable frame 71 capable of distributing the forces applied to the frame pair 71 on the framework 1. Reference numeral 82 is the rod of the cylinder 77 at the top equipped with pairs of support plates 83 of the pulleys 84 suitable for the return of the pair of cables or chains 85, the upper ends of which are fastened to the beam 80; 86 indicates driving gear pulleys; 87 indicates a pair of opposed frames of the telescopic device 75 of the low path, to which the lower end of each cable or chain 85 is fastened. Reference numeral 88 (FIG. 46) indicates a pair of vertically movable slides forming the high path device; 89 is an hydraulic operation cylinder fastened to the pair of cross members 78 of each side body pair 79 of the pair of movable frames 71. Reference numeral 90 indicates the cylinder 89 rod, at the top equipped with the support 91 for a pair of return pulleys 92 of the pair of cables or chains 93 previously returned by pulleys 94 and at the top fastened to the beam 80; 95 is the body of the frame of the slide 88, to which the lower ends of the cables or chains 93 are fastened. Reference numeral 96 (FIG. 48) indicates two pairs of transversal brackets, sideways retractable by rotation, which are hinged to the inside of the beams 81 in order to support the containers 3 or 76 at the top segment of the framework 1. Reference numeral 97 (FIG. 47) indicates two pairs of retractable arms or brackets hinged at 98 to each pair of frames 87 in order to support the containers 3 or 76. Reference numeral 99 (FIG. 48) indicates two pairs of hydraulic operation cylinders fastened to each pair of beams 81; each cylinder 99 is equipped with two opposed rods 100 in order to drive the arms 96 to rotate through 90°. Reference numeral 101 (FIGS. 49, 50) indicates a pair of sleeves forming the central part of the telescopic device 75 of the low path; each frame 87 is connected to said sleeves 101 in a telescopic way and may be fastened in a fixed position by means of shutters 102. Reference numeral 103 indicates two pairs of hydraulic operation cylinders, each fastened to an appendix of the corresponding frame 87; the rod 104 of each cylinder 103 is hinged to a side appendix 105 of the arm 97. Reference numeral 106 indicates two pairs of squares for the centering of the container edges, when the container is to be positioned on a trailer. Reference numeral 107 (FIGS. 53, 54) is an hydraulic operation cylinder arranged on each arm 97, the rod of which 108 is hinged at the end of the winch 109 keyed to the stake 110; at to bottom of the stake a grabbing key 111 of a type already known is provided, said key being intended to penetrate into a corner block 112 at the top of the container 3 or 76 and to be blocked there by means of a rotation through 90°. Reference numeral 113 is a sleeve integral with each frame 87 which couples with the pivot of the hinge 98 and with the opposed pivot 114 of the centering square 106. Reference numeral 115 (FIG. 55) is an hydraulic operation cylinder hinged to an appendix of the sleeve 113, the rod of which 116 is hinged to the square 106. Reference numeral 117 (FIGS. 56 and 57) is a plate fastened to the outside of the lower part of each body side 79; said plate bears a pair of horizontal members 118 equipped with guides 119 where the longitudinally brackets retractable 120 slide, the end of which is equipped with a rise 121 to support the container 3 or 76 in the intermediate position. Reference numeral 122 is an hydraulic operation cylinder hinged to a plate 123 integral with the longitudinal members 118, the rod 124 of the cylinder 122 is hinged to the bracket 120. Reference numeral 125 (FIGS. 58, 59, 60) indicates a pair of brackets of the body 95 of the slide 88 equipped with two pairs of wheels 126, forming a vertical guide in the longitudinal direction and with two pairs of wheels 127 serving as a vertical guide in the transversal direction; 128 indicates hydraulic operation cylinders, each fastened at the inside of a cap 129 applied with a flange to the sleeve 130 fastened to each end of the body 95. Reference numeral 131 is the rod of the cylinder 128 hinged to the gudgeon 132 of the piston 133 sliding at the inside of the bushing 130 and equipped with a shutter or end stake 134 destined to penetrate into the corresponding bore 135 of the lower corner block 136 of the container 3 or 76. Reference numeral 137 (FIGS. 61, 64) indicates the upper corner mouths for the entry of the container 3 or 76 on the laterally retractable support pairs 96, while 138 (FIGS. 62 and 65) indicates two pairs of vertical C-guides where the wheels 139 of the frame pair 87 roll. Reference numeral 140 is the lower lead-in of the guides 138 and 141 (FIGS. 63 and 64) is the winch keyed on the vertical pivot 142 of each container transversal bracket 96; the end of said winch being hinged to the rod 100 of the cylinder 99. Reference numeral 143 (FIGS. 59, 61, 65) indicates two pairs of vertical C-guides arranged at the inside of the side body pairs 79 for the gliding of the wheels 126 and 127. Reference numeral 144 (FIGS. 68, 69, 70) is a cap fastened to each end of the body 95 of the slide 88, on the inside of which an hydraulic operation cylinder 145 is fastened: the rod 146 is hinged in the gudgeon 147 of the piston 148 sliding in the cap 144, said piston ending with a bracket 149 projecting towards the inside of the empty space of the elevator in order to form the support of a corner of the base of a container 3 or 76. Reference numeral 150 (FIG. 71) is the hydraulic station mounted on the pair of frames 71 for the operation of all cylinders supported by the frame; 151 (FIG. 74) is the loading platform of the truck trailer, the vertical center-line axis of which is intentionally shifted with respect to the vertical axis E of the elevator tunnel. Reference numeral 152 is a pair of lugs of the sleeve 101 of frame 75, said lugs being placed on the side of the tunnel toward which the trailer is laterally shifted with respect to the axis E of the tunnel. Reference numeral 153 indicates a ring-shaped chain at the top wound on a first pulley 154, the axis of which is fastened to framework 1, which is driven by a second pulley 155 and embraces a third pulley 157 hinged in the pair of lugs 152 and is again driven by a fourth pulley 158 connected with the pulley 155 by means of the plate 159, said second and fourth pulleys being movable along the vertical guides 156. Reference numeral 160 indicates another driving pulley of the chain 153 suspended on the chain itself at the lower reversal point thereby, the pivot 161 of which is guided by vertical sliding in the slot 162 of the framework 1. Reference 163 indicates a pair of unilateral vertical arms, the inner lower end 164 of which is intended to rest against a side surface 165 of the loading platform 151 in order to push the body to center on the platform. Reference numeral 166 indicates (FIG. 77) the railway wagons introduced into the tunnel; 167 and 168 are two winches for the winding of the cable arranged sideways in the lower part of side of the framework 1, a cable 169 being hooked at its end to the series of wagons 166. Reference numerals 170 to 192 indicate the elements of high path means shaped as a paternoster device.

The paternoster device comprises two parts, a left-hand part which is shown at FIGS. 79 to 82 and a right-hand part, not shown, which is assembled in exactly the same way as the left-hand part.

Reference numerals 170 and 171 (FIG. 79) indicate a first pair of support brackets for a container 3 or 76, fastened to the links of a first chain pair 172.

Reference numerals 173 and 174 (FIG. 80) indicate a second pair of support brackets for a container 3 or 76, fastened to a second chain pair 175.

Reference numeral 176 indicates a first geared motor, which drives a first pair of gears 179 by means of a third chain pair 177.

The first pair of gears 179 drives a lower shaft 178.

A second pair of gears 180, which drives the pair of chains 172, is keyed on the shaft 178.

Reference numeral 181 indicates a second geared motor, which drives a third pair of gears 183 by means of a fourth chain pair 182.

The third pair of gears 183 drives an upper shaft 184, on which a fourth pair of gears 185 is keyed.

The fourth pair of gears 185 drives the chain pair 175.

Reference numeral 186 (FIG. 82) indicates a pair of vertical guides for each chain on each side of the paternoster device; said guides being fastened to the pair of movable frames 71.

Reference numeral 187 indicates a vertical section element connecting each pair of guides 186, while 188 indicates a top guide shoe embodied in the support 189 of the bracket 170.

Reference numeral 190 is a bottom guide of the bracket 170 and 191 is a connection pin of each of chains 172.

Each chain 172 is divided into two parts, which are connected to each other by means of the pin 191.

Reference numeral 192 indicates transversal slots provided in the support 189 in order to allow clearance of the pin 191.

Reference numeral 193 indicates centering elements fastened to the platform 151 of the trailer.

Figure 32:
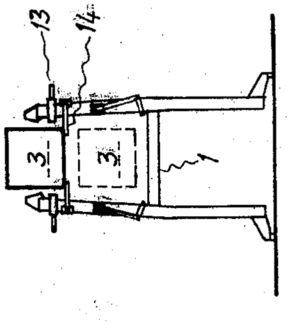
Figure 33:
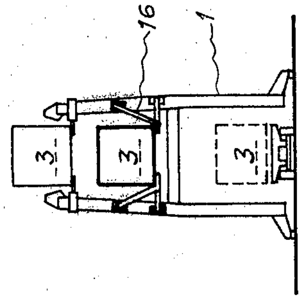
Figure 34:
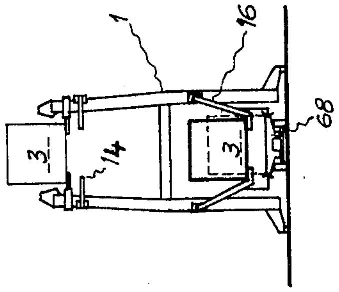
Figure 35:
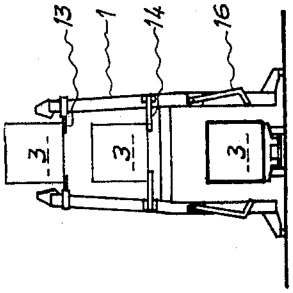
Figure 36:
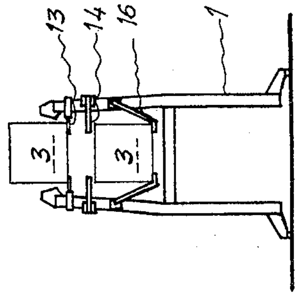
Figure 37:
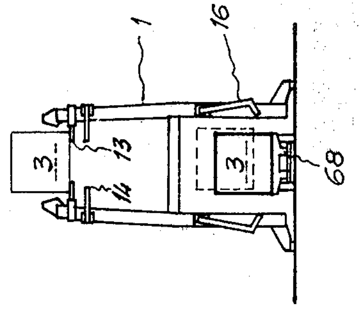
Figure 38:
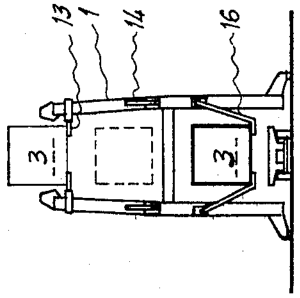
Figure 39:
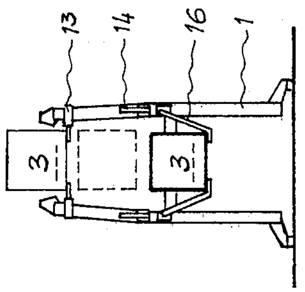
Figure 40:
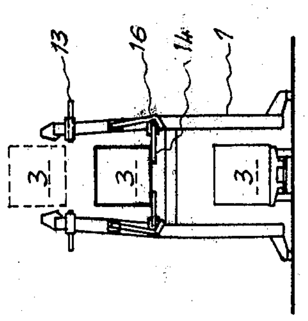
Figure 41:
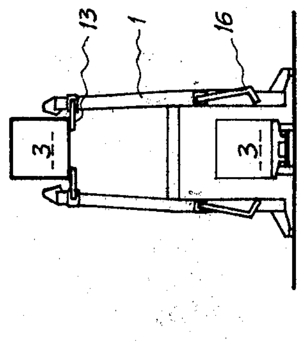
Figure 42:
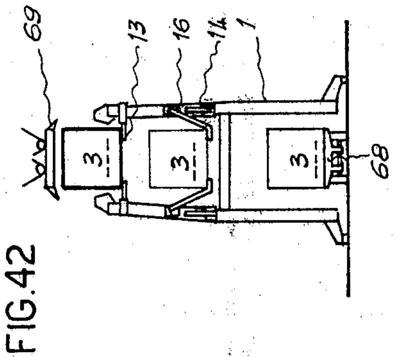

In the case of the elevator described in the FIGS. 1 to 42 operation takes place in the following manner: when container unloading operations are to be performed (FIGS. 31–36), the grabbing element 69 of the crane deposits the container 3 in the top position of the elevator 1, positioning it in a stable way on at least four retractable supports 13 (FIG. 31); the laterally retractable brackets 14 driven by the cylinders 6 of the "high path" rise above the level of the supports 13, lifting the container 3 for some centimeters and freeing the supports, which re-enter, leaving the empty space free for the descent of the container toward the intermediate position (FIG. 32). The arms 16, risen in retracted state up to the intermediate position operated by the "low path" cylinders 7, approach each other transversally in order to receive the coontainer 3, while the brackets 14 continue their descent for some centimeters and rotate leaving the empty space free (FIG. 33); then the arms 16 descend with the container nearly up to the truck trailer level 68 (FIG. 34). Continuing the descent, the container 3 centers on the centering elements fastened to the trailer platform 68; then the arms 16, driven by the cylinders 20, retract (FIG. 35). The trailer 68 leaves, freeing the gallery and allowing the re-start of the cycle (FIG. 36). The whole operation is controlled by optical and mechanical devices, by gallery entry and exit traffic lights and by safety devices. The loading operations (FIGS. 37–42) take place mutually with the unloading operations: as soon as the gallery is free, the trailer 68 comes into the gallery together with the container 3, while the arms 16 are retracted (FIG. 37); the arms 16, driven by the cylinders 20, approach each other, grab the container 3 and, pushed by the "low path" cylinders 6, raise it up to the intermediate position after the container has been centered and aligned by the balanced cylinders 20 (FIGS. 38 and 39). The brackets 14, having again entered the empty space under the container 3, are driven to rise by the "high path" cylinders 7 to receive the container and to allow the brackets 16 to retract (FIG. 40). Then the brackets 14 rise above the top position, permitting the retractable elements to come out and to take the container 3 (FIGS. 41 and 42).

The same is true for the machine illustrated in FIGS. 17 to 30, considering that there are different component devices. It is to be observed that—unlike the prior art—the position of the container 3 compared to the elevator above can conveniently be determined within pre-established narrow tolerances owing to an easily accomplished positioning of the trailer inside a gallery obtained between the body sides of the low part of the elevator framework 1. Besides being of economical construction, thanks to the centralization and simplification of the mechanisms, the elevator described in FIGS. 43 to 82 allows advantageously to load and unload containers having different lengths owing to the presence of grabbing elements which are movable in the longitudinal direction and thus may be quickly positioned among each other at a distance equal to the length of the container. Moreover, the system of grabbing the containers in the corner blocks during all phases of their transfer is safer than the support system mainly adopted in the elevator described in FIGS. 1 to 42. The operation of the elevator of structure shown in FIGS. 43 to 82 takes place in the following manner: before starting the loading and unloading operations the low path telescope frame 75 must be in its highest position the two longitudinally movable upper frames 71 are then positioned at a distance corresponding to the length of the long containers 3 or the containers 76 of intermediate size and are locked in that position with suitable means. Thus, also the opposed frames 87 of the telescope frame 75 are positioned at the necessary length in order to be blocked by means of shutters 102. When unloading operations have to be done (FIG. 73) the grabbing element of the crane deposits the container 3 or 76 in the top position; the container is supported by the brackets 96 of each frame 71. The slides 88 of the high path device are engaged on the lower corner blocks 136 of the container by means of four shutters 134 in order to lift the container by some centimeter, thus freeing the supports 96, which are laterally deviated, leaving the empty space free for the descent of the container to the intermediate position. The container is then deposited on the bracket 121 of the supporting elements 74 situated towards the lower end of the two pairs of trasversal body sides 79, which are part of the pair of movable frames 71. The shutters 134 of the high path device then re-enter, freeing the lower blocks 136 and thus allowing the device to rise again to the top position for a new operation; meanwhile the brackets 97 of the frames 87, being part of the low path telescope frame 75, come out into the empty space and descend, until they come to rest sideways on the upper corner blocks 112 of the container. The grabbing keys 111 of the arms 97 engage from above with said blocks and the container is lifted by some centimeters from the frame 75, freeing the brackets 121 of the supporting elements 74 of the movable frame pair 71, which re-enter, thus leaving the empty space of the elevator free. The low path frame 75 descends with the container nearly up to the trailer platform 151 in the tunnel below; continuing the descend, the container centers automatically in the elements 193 of the trailer, coming to rest on the platform of the trailer. Keys 111 are then rotated and extracted from the upper blocks 112 of the container 3 or 76; the arms 97 rotate in order to free the empty space and the low path frame 75 again rises up to the intermediate position. Loading operations take place in the following manner: the trailer carrying the container on its loading platform 151 comes into the tunnel guided by optical and mechanical devices which allow that the container to be placed in a centered position; the frame 75 of the low path device descends, while its arms 97 come out and the square pairs 106 center on the container in such a way that the grabbing key 111 can enter each upper corner block 112 engaging the container. The frame 75 rises again carrying the container a few centimeters above the intermediate position; then the brackets 121 of the intermediate position support elements 74 come out and the container is deposited on the brackets. The low path frame 75 disengages from the corner blocks 112 of the container, its arms re-enter and the frame descends in order to withdraw another container. The slides 88, being part of the high path device, then move to a position which allows the shutters 134 to insert sideways in the lower corner blocks 136 of the container in order to transport it to the top position. As to the centering device of FIG. 74 it is to be considered that a counterweight (not shown) is connected to the axle connecting the pair of pulleys or sheaves 160, said counterweight being capable of balancing the "low path" device. The operation includes the lateral shifting of the container 3, 76 by means of the arm pair 163 which push the container sideways until their vertical board 164 touches the side edge 165 of the loading platform 151. This shifting is determined by the equiverse lateral sliding of the pair of pulleys 157. The lateral sliding is operated by the pair of horizontal sections of the chain 153 driven by the pulleys 155 and 158 which are driven to slide horizontally by a convenient counterweight applied to the common axle of the pulley pair 160, sliding vertically in the pair of slots 162 of the stanchions of the framework 1. The paternoster device of FIGS. 79, 80, 81, 82 can be replaced by the "high path" device of FIG. 66 and others, if it is necessary to eliminate the dead return run in order to speed up the operations. The paternoster device can in some cases by more cumbersome and expensive than the device shown in FIG. 66. The paternoster device comprises a pair of oppposted elements of the same type as those shown in FIGS. 79 to 82 assembled on the inside of a pair of transversal body members 79 with the shafts 178, 184 arranged in transversal direction. The paternoster device delivers the containers 3, 76 to, and receives them from the "low path" device of FIG. 67 and others.

In more detail, the operations of the "low path" device concerning the delivery take place in the following manner: two pairs of opposed brackets, for example 170 driven in reverse motion by the motor 176, rise lifting the container 3, 76 for a few centimeters from the pair of brackets 96 of the top position in order to allow the freeing of the empty space with vertical axis. Then, reversing the sense of movement, the brackets 170 descend and deposit the container on the pairs of retractable brackets 120, 121 of the intermediate position. The container is then lifted for a few centimeters by means of arms 97 of the the "low path" device, after inserting the two pairs of keys 111 into the corresponding upper corner blocks 112. Once the brackets 120, 121 have been retracted, the "low path" device descends in order to transfer the container 3, 76 to the trailer below. As soon as the two pairs of brackets 170 have finished their work, the other two pairs of brackets 171, more towards the outside, are ready to repeat the same maneuver with another container placed in the top position by the crane. Analogously for the reverse maneuver, considering that the transfer is made from the bottom to the top.

In the practical realization of the invention, the materials, the sizes, the execution details, the container types 3, their compositions, the shape of the grabbing and support elements, the number of positions and therefore the path sections in elevation, the hoisting devices may be different from those indicated, but technically equivalent without leaving the juridical dominion of this invention. Moreover, the hooking and the transfer operations may be manual or automatic or programmed by a computer; finally the gallery may be off-center compared to the empty rising space. In the case of quay cranes of new construction the elevator may completely or in part incorporated with the crane; finally, if the elevator is equipped with wheels, it may be connected with the crane so as to move with it without changing the relative position. The elevator 1 may also be adapted to trailers, which can be loaded on two levels.

I claim:

1. An elevator for handling containers, particularly in harbours, comprising a self-propelled framework means having a lower part for receiving a carrier of a number of said containers, characterized in that said framework means defines a passageway therein for vertical transfer of containers in either vertical direction;

said passageway having a top portion and a bottom portion and being open at said top and bottom portions;

said passageway further having a longitudinal section having a length corresponding to that of at least one container aligned therein;

said framework means being equipped with a low path means for the vertical transfer of the containers from the carrier thereof to an intermediate position in said passageway, and vice versa, from the intermediate position in said passageway to the carrier of the containers;

said framework means being further equipped with a high-path means for the vertical transfer of the containers from said intermediate position to a top segment of the framework means and vice versa, from the top segment of the framework means to said intermediate position;

said framework means further having first means to support the container in said intermediate position and second means to support the container at the top segment of the framework means.

2. An elevator as recited in claim 1 wherein said framework means includes vertical guide means, said low path means comprises two pairs of articulated arms hinged to a first couple of slides which glide on the vertical guide means of said framework means;

driving means connected for driving said slides;

said articulated arms being equipped at bottom parts thereof with a container support bracket hinged to a vertical pivot and having a square bearing means at one of its ends for grabbing of a container at a bottom section thereof;

said bearing including a feeler point and being hinged to said support bracket by a horizontal pivot;

each of said articulated arms being moved by a respective hydraulic cylinder of said driving means, said hydraulic cylinders hinged to a respective slide.

3. An elevator as recited in claim 2 wherein the high path means comprises pairs of brackets retractable by rotation, said brackets hinged to a second couple of slides sliding on separate vertical guide means offset from the first mentioned guide means of said first couple of slides;

said second couple of slides being driven by a high path driving means, offset as well from said low path means;

said pairs of brackets being equipped with an end feeler and fastened to the second couple of slides by means of hinge pins which are interconnected by an articulated parallelogram;

a further hydraulic cylinder connected for angularly shifting the articulated parallelogram;

the lowest level reached by said pairs of brackets being slightly below the upper level reached by the low path means.

4. An elevator as recited in claim 3, wherein immediately below the upper level reached by said pairs of brackets there are disposed container support devices attached to said framework means, said support devices comprising at least two pairs of retractable top supports, offset from said pairs of brackets and each equipped with an end feeler;

each top support being guided in a casing with a prismatic section and driven by a hydraulic cylinder inserted in a housing aligned with said casing and fixed to said framework means.

5. An elevator as recited in claim 1, wherein the low path means comprises a pair of longitudinal beams, each equipped with two horizontal shutters therein having an end means for penetrating into a side grip slot of a corresponding upper corner block of the container;

said pair of beams, vertically guided by masts of said framework means, being connected to a first winch by pairs of cables operated by pulleys;

a hanging perimeter frame being arranged below said pair of beams for engagement with an upper edge of the container during a descent thereof;

said hanging perimeter frame being supported by two pairs of cables each ending at a counter-weight gliding vertical guides fastened to heads of said framework means, after returning towards the bottom portion by means of the pulleys;

said hanging perimeter frame having at its bottom a trapezoidal section having an enlarged means toward the bottom for gripping and centering of the container.

6. An elevator as recited in claim 5, wherein the high path means comprises a horizontal perimeter frame passing on the outside of said pair of beams and equipped with two pairs of head shutters for entry into corresponding slots of lower head corner blocks of the container;

said horizontal perimeter frame being supported by cables driven by the pulleys connected with a second winch and guided by the masts of the body side of said framework means.

7. An elevator as recited in any one of claims 1 or 5 or 6 wherein container support devices are provided at a position just below a lower end of the high path means, the support devices comprising sideways retractable brackets, retractable by rotation of retractable supports therefor.

8. An elevator as recited in claim 1, wherein a top of the elevator comprises pairs of lead-in elements for introduction of the containers into the passageway from above.

9. An elevator as recited in claim 1 wherein said second means to support the container at the top segment of the framework means comprises a pair of longitudinally movable frames;

said longitudinally movable frames being mounted on wheels rolling on rails fastened at the top segment of the framework means;

each of said longitudinally movable frames comprising a pair of supporting beams forming longitudinal sides thereof and a pair of cross body sides interconnected by a cross member at top parts thereof;

said cross body sides extending downwards into said passageway;

said cross body sides being equipped at bottom parts thereof with longitudinally retractable brackets to support the container at said intermediate position;

each of said longitudinal sides being equipped with a pair of transversal brackets sideways retractable by rotation.

10. An elevator as recited in claim 9 wherein the high path means comprises a pair of vertically movable slides;

each of said vertically movable slides being suspended from a bottom end of a pair of cables;

said cables being fastened at their top end to a corresponding cross body side of said longitudinally movable frames.

11. An elevator as recited in claim 10 wherein said vertically movable slides are equipped with a pair of brackets having wheels which glide on vertical C-guides;

said vertical movable slides being equipped with means at each of their ends for grabbing of a container at lower corner blocks thereof;

said means for grabbing comprising hydraulic cylinders, each having a rod hinged to a piston which is equipped with a head shutter for entry into corresponding bores of lower corner blocks of the container;

each of said hydraulic cylinders being fastened at the inside of a cap applied to a sleeve connected to the corresponding end of said vertically movable slides.

12. An elevator according to claim 10 wherein said vertically movable slides are equipped with container support means at each of their ends;

said container support means comprising hydraulic cylinders, each having a rod hinged to a piston sliding into a cap;

said piston ending with a bracket projecting towards the inside of the passageway.

13. An elevator as recited in claim 9 wherein the low path means comprises a vertically movable horizontal telescopic device;

said telescopic device being suspended from a bottom end of a pair of cables;

said cables being fastened at their top end to said upper cross member of said pair of cross body sides.

14. An elevator as recited in claim 13 wherein said telescopic device comprises a pair of opposed horizontal frames equipped with container grabbing means;

said horizontal frames being connected telescopically to a pair of sleeves which constitute a central part of said telescopic device;

said grabbing means comprising two pairs of retractable arms hinged to said opposed frames, and hydraulic cylinders arranged on said retractable arms;

each of said hydraulic cylinders having a rod hinged at the end of winch keyed to a stake;

said stake having at its bottom end a grabbing key for entry into a corresponding top corner block of a container.

15. An elevator as recited in claim 14 wherein each of said opposed frames is equipped with vertical sleeves each of which couples with a pivot of the hinge of a retractable arm and with a pivot of a centering square to center edges of the container on a loading platform of a trailer.

16. An elevator as recited in claim 14 wherein each of said opposed horizontal frames is equipped with a vertical arm to push a container sideways towards the center of a loading platform of a trailer;

each of said opposed frames being further equipped with a pair of lugs connected to one of said sleeves;

each of said opposed frames being laterally shifted by means of a ring-shaped chain;

said chain being wound at its top portion around a first pulley and being driven by a second and a fourth pulley which are movable along vertical guides;

said chain embracing a third pulley hinged to a pair of said lugs;

another driving pulley being suspended at the bottom portion of said chain and having a pivot vertically movable in a slot of the framework means;

a counterweight being connected to said another driving pulley.

17. An elevator as recited in claim 9 wherein two winches are arranged at a bottom end of a side of the framework means;

said winches being intended to wind a cable, the ends of which are hooked to ends of a series of railway wagons.

18. An elevator as recited in claim 9 wherein the high path means comprises a paternoster device comprising a left-hand part and a right-hand part;

each part of said paternoster device comprising a first and second pair of support brackets fastened to links of a first and second chain pair respectively;

a first geared motor which drives a first pair of gears by means of a third chain pair;

a lower shaft, driven by said first pair of chains, on which a second pair of gears is keyed;

a second geared motor which drives a third pair of gears by means of a fourth pair of chains;

an upper shaft, driven by said third pair of gears, on which a fourth pair of gears is mounted;

said first and second chain pairs being driven by said second and fourth pair of gears, respectively.

* * * * *